United States Patent [19]

Walters et al.

[11] Patent Number: 4,495,063
[45] Date of Patent: Jan. 22, 1985

[54] CARBOMETALLIC OIL CONVERSION WITH BALLISTIC SEPARATION

[75] Inventors: Paul W. Walters, Ashland; Roger M. Benslay, Catlettsburg; Dwight F. Barger, Russell, all of Ky.

[73] Assignee: Ashland Oil, Inc., Ashland, Ky.

[21] Appl. No.: 438,074

[22] Filed: Nov. 1, 1982

Related U.S. Application Data

[62] Division of Ser. No. 263,394, May 13, 1981, Pat. No. 4,390,503.

[51] Int. Cl.$^3$ .............................................. C10G 11/18
[52] U.S. Cl. .................................... 208/113; 208/161
[58] Field of Search ................ 208/113, 161, 164, 153

[56] References Cited

U.S. PATENT DOCUMENTS

| | | | |
|---|---|---|---|
| 3,074,878 | 1/1963 | Pappas | 208/127 |
| 3,835,029 | 9/1974 | Larson | 208/113 |
| 4,066,533 | 1/1978 | Myers et al. | 208/153 |
| 4,295,961 | 10/1981 | Fahrig et al. | 208/161 |
| 4,318,800 | 3/1982 | Woebcke et al. | 208/127 |
| 4,374,019 | 2/1983 | Hettinger, Jr. et al. | 208/120 |
| 4,405,444 | 9/1983 | Zandona | 208/113 |
| 4,435,279 | 3/1984 | Busch et al. | 208/111 |

Primary Examiner—Delbert E. Gantz
Assistant Examiner—O. Chaudhuri
Attorney, Agent, or Firm—Richard C. Willson, Jr.; Carl D. Farnsworth

[57] ABSTRACT

A particular aspect of the invention concepts disclosed and described is directed to the use of a vented cup ballistic separation device and method of use for achieving rapid separation of a suspension of fluidized solid particulate and gasiform material. The vented cup ballistic separation apparatus is particularly discussed in conjunction with separating a suspension of catalyst particles from vaporous hydrocarbon reaction products of catalytic cracking discharged from a riser cracking operation. The vented cup ballistic separation apparatus particularly comprises an annular chamber about the upper periphery of an open ended riser conduit. The annular chamber is open in the upper end and one or more open end conduits extend outwardly from the annular chamber comprising means for attachment to cyclone separation means. The riser with vented cup or annular chamber terminates within a larger diameter chamber.

5 Claims, 3 Drawing Figures

CARBOMETALLIC OIL CONVERSION WITH BALLISTIC SEPARATION

This application is a division of application Ser. No. 263,394, filed May 13, 1981 now U.S. Pat. No. 4,390,503.

TECHNICAL FIELD

This invention relates to processes for converting heavy hydrocarbon oils into lighter fractions, and especially to processes for converting heavy hydrocarbons containing high concentrations of coke precursors and heavy metals into gasoline and other liquid hydrocarbon fuels.

BACKGROUND ART

In general, gasoline and other liquid hydrocarbon fuels boil in the range of about 100° to about 650° F. However, the crude oil from which these fuels are made contains a diverse mixture of hydrocarbons and other compounds which vary widely in molecular weight and therefore boil over a wide range. For example, crude oils are known in which 30 to 60% or more of the total volume of oil is composed of compounds boiling at temperatures above 650° F. Among these are crudes in which about 10% to about 30% or more of the total volume consists of compounds so heavy in molecular weight that they boil above 1025° F. or at least will not boil below 1025° F. at atmospheric pressure.

Because these relatively abundant high boiling components of crude oil are unsuitable for inclusion in gasoline and other liquid hydrocarbon fuels, the petroleum refining industry has developed processes for cracking or breaking the molecules of the high molecular weight, high boiling compounds into smaller molecules which do boil over an appropriate boiling range. The cracking process which is most widely used for this purpose is known as fluid catalytic cracking (FCC). Although the FCC process has reached a highly advanced state, and many modified forms and variations have been developed, their unifying factor is that a vaporized hydrocarbon feedstock is caused to crack at an elevated temperature in contact with a cracking catalyst that is suspended in the feedstock vapors. Upon attainment of the desired degree of molecular weight and boiling point reduction the catalyst is separated from the desired products.

Crude oil in the natural state contains a variety of materials which tend to have quite troublesome effects on FCC processes, and only a portion of these troublesome materials can be economically removed from the crude oil. Among these troublesome materials are coke precursors (such as asphaltenes, polynuclear aromatics, etc.), heavy metals (such as nickel, vanadium, iron, copper, etc.), lighter metals (such as sodium, potassium, etc.), sulfur, nitrogen and others. Certain of these, such as the lighter metals, can be economically removed by desalting operations, which are part of the normal procedure for pretreating crude oil for fluid catalytic cracking. Other materials, such as coke precursors, asphaltenes and the like, tend to break down into coke during the cracking operation, which coke deposits on the catalyst, impairing contact between the hydrocarbon feedstock and the catalyst, and generally reducing its potency or activity level. The heavy metals transfer almost quantitatively from the feedstock to the catalyst surface.

If the catalyst is reused again and again for processing additional feedstock, which is usually the case, the heavy metals can accumulate on the catalyst to the point that they unfavorably alter the composition of the catalyst and/or the nature of its effect upon the feedstock. For example, vanadium tends to form fluxes with certain components of commonly used FCC catalysts, lowering the melting point of portions of the catalyst particles sufficiently so that they begin to sinter and become ineffective cracking catalysts. Accumulations of vanadium and other heavy metals, especially nickel, also "poison" the catalyst. They tend in varying degrees to promote excessive dehydrogenation and aromatic condensation, resulting in excessive production of carbon and gases with consequent impairment of liquid fuel yield. An oil such as a crude or crude fraction or other oil that is particularly abundant in nickel and/or other metals exhibiting similar behavior, while containing relatively large quantities of coke precursors, is referred to herein as a carbo-metallic oil, and represents a particular challenge to the petroleum remaining refiner.

In general, the coke-forming tendency or coke precursor content of an oil can be ascertained by determining the weight percent of carbon remaining after a sample of that oil has been pyrolyzed. The industry accepts this value as a measure of the extent to which a given oil tends to form non-catalytic coke when employed as feedstock in a catalytic cracker. Two established tests are recognized, the Conradson Carbon and Ramsbottom Carbon tests, the former being described in ASTM D189-76 and the latter being described in ASTM Test No. D524-76. In conventional FCC practice, Conradson carbon values on the order of about 0.05 to about 1.0 are regarded as indicative of acceptable feed. The present invention is concerned with the use of hydrocarbon feedstocks which have higher Conradson carbon values and thus exhibit substantially greater potential for coke formation than the usual feeds.

Since the various heavy metals are not of equal catalyst poisoning activity, it is convenient to express the poisoning activity of an oil containing a given poisoning metal or metals in terms of the amount of a single metal which is estimated to have equivalent poisoning activity. Thus, the heavy metals content of an oil can be expressed by the following formula (patterned after that of W. L. Nelson in *Oil and Gas Journal*, page 143, Oct. 23, 1961) in which the content of each metal present is expressed in parts per million of such metal, as metal, on a weight basis, based on the weight of feed:

Nickel
Equivalents=Ni+(V/4.8)+(Fe/7.1)+(Cu/1.23)

According to conventional FCC practice, the heavy metal content of feedstock for FCC processing is controlled at a relatively low level, e.g., about 0.25 ppm Nickel Equivalents or less. The present invention is concerned with the processing of feedstocks containing metals substantially in excess of this value and which therefore have a significantly greater potential for accumulating on and poisoning catalyst.

The above formula can also be employed as a measure of the accumulation of heavy metals on cracking catalyst, except that the quantity of metal employed in the formula is based on the weight of catalyst (moisture free basis) instead of the weight of feed. In conventional FCC practice, in which a circulating inventory of catalyst is used again and again in the processing of fresh feed, with periodic or continuing minor addition and withdrawal of fresh and spent catalyst, the metal content of the catalyst is maintained at a level which may for example be in the range of about 200 to about 600 ppm Nickel Equivalents. The process of the present invention is concerned with the use of catalyst having a substantially larger metals content, and which therefore has a much greater than normal tendency to promote dehydrogenation, aromatic condensation, gas production or coke formulation. Therefore, such higher metals accumulation is normally regarded as quite undesirable in FCC processing.

There has been a long standing interest in the conversion of carbo-metallic oils into gasoline and other liquid fuels. For example, in the 1950s it was suggested that a variety of carbo-metallic oils could be successfully converted to gasoline and other products in the Houdresid process. Turning from the FCC mode of operation, the Houdresid process employed catalyst particles of "granular size" (much larger than conventional FCC catalyst particle size) in a compact gravitating bed, rather than suspending catalyst particles in feed and produce vapors in a fluidized bed.

Although the Houdresid process obviously represented a step forward in dealing with the effects of metal contamination and coke formation on catalyst performance, its productivity was limited. Because its operation was uneconomical, the first Houdresid unit is no longer operating. Thus, for the 25 years which have passed since the Houdresid process was first introduced commercially, the art has continued its arduous search for suitable modifications or alternatives to the FCC process which would permit commercially successful operation on reduced crude and the like. During this period a number of proposals have been made; some have been used commercially to a certain extent.

Several proposals involve treating the heavy oil feed to remove the metal therefrom prior to cracking, such as by hydrotreating, solvent extraction and complexing with Friedel-Crafts catalysts, but these techniques have been criticized as unjustified economically. Another proposal employs a combination cracking process having "dirty oil" and "clean oil" units. Still another proposal blends residual oil with gas oil and controls the quantity of residual oil in the mixture in relation to the equilibrium flash vaporization temperature at the bottom of the riser type cracker unit employed in the process. Still another proposal subjects the feed to a mild preliminary hydrocracking or hydrotreating operation before it is introduced into the cracking unit. It has also been suggested to contact a carbo-metallic oil such as reduced crude with hot taconite pellets to produce gasoline. This is a small sampling of the many proposals which have appeared in the patent literature and technical papers.

Notwithstanding the great effort which has been expended and the fact that each of these proposals overcomes some of the difficulties involved, conventional FCC practice today bears mute testimony to the dearth of carbo-metallic·oil-cracking techniques that are both economical and highly practical in terms of technical feasibility. Some crude oils are relatively free of coke precursors or heavy metals or both, and the troubesome components of crude oil are for the most part concentrated in the highest boiling fractions. Accordingly, it has been possible to largely avoid the problems of coke precursors and heavy metals by sacrificing the liquid fuel yield which would be potentially available from the highest boiling fractions. More particularly, conventional FCC practice has employed as feedstock that a fraction of crude oil which boils at about 650° F. to about 1,000° F., such fractions being relatively free of coke precursors and heavy metal contamination. Such feedstock, known as "vacuum gas oil" (VGO) is generally prepared from crude oil by distilling off the fractions boiling below about 650° F. at atmospheric pressure and then separating by further vacuum distillation from the heavier fractions a cut boiling between about 650° F. and about 900° to 1025° F.

The vacuum gas oil is used as feedstock for conventional FCC processing. The heavier fractions are normally employed for a variety of other purposes, such as for instance production of asphalt, residual fuel oil, #6 fuel oil, or marine Bunker C fuel oil, which represents a great waste of the potential value of this portion of the crude oil, especially in light of the great effort and expense which the art has been willing to expend in the attempt to produce generally similar materials from coal and shale oils. The present invention is aimed at the simultaneous cracking of these heavier fractions containing substantial quantities of both coke precursors and heavy metals, and possibly other troublesome components, in conjunction with the lighter oils, thereby increasing the overall yield of gasoline and other hydrocarbon liquid fuels from a given quantity of crude. As indicated above, the present invention by no means constitutes the first attempt to develop such a process, but the long standing recognition of the desirability of cracking carbo-metallic feedstocks, along with the slow progress of the industry toward doing so, show the continuing need for such a process. It is believed that the present process is uniquely advantageous for dealing with the problem of treating such carbo-metallic oils in an economically and technically sound manner.

One method of cracking these high boiling fractions, named Reduced Crude Conversion (RCC) after a particularly common and useful carbo-metallic feed, is disclosed in copending applications Ser. No. 94,092 now U.S. Pat. 4,332,673 and Ser. No. 94,216 now U.S. Pat. No. 4,341,624, each filed Nov. 14, 1979, for "Carbo-Metallic Oil Conversion" and each being incorporated herein by reference. The oils disclosed as capable of being cracked by the methods of these applications are carbo-metallic oils of which at least about 70 percent boils about 650° F. and which contain a carbon residue on pyrolysis of at least about 1 and at least about 4 parts per million of Nickel Equivalents of heavy metals.

In the performance of the above process, the abrupt separation of catalyst from product vapors and unconverted feed (if any) has been found to be of great assistance. Not only is after cracking of products suppressed, but such abrupt separation is also beneficial from the standpoint of helping to control the coke laydown on catalyst, and consequently the heat load in the regenerator. For these reasons, the so called vented riser apparatus disclosed in U.S. Pat. Nos. 4,070,159 and 4,066,533 to George D. Myers, Paul W. Walters and Robert L. Cottage has been the preferred type of apparatus for conducting the RCC process. It appears however that the foregoing benefits could be enhanced if an even more efficient and rapid technique for separation of catalyst from product vapors could be found, thus resulting in an improved version of the basic RCC process. Such is the object of the present invention.

SUMMARY OF THE INVENTION

The present invention includes a process for economically converting carbo-metallic oils to lighter products, as well as apparatus which is useful for effecting separation of gases (including vapors) of any kind from a stream of such gases and solid particles of any kind exiting from an elongated tubular member having an outlet section at least partially disposed within a disengagement chamber. Such apparatus has among its principal and favorite uses the separation of catalyst particles from hydrocarbon conversion products, such as the products resulting from the fluid catalytic cracking of a petroleum feedstock.

In accordance with the process aspect of the present invention, carbo-metallic oils are economically converted to lighter products. This process includes providing a converter feed containing 650° F.+ material characterized by a carbon residue on pyrolysis of at least about 1 and by containing at least about 4 parts per million of Nickel Equivalents of heavy metal(s). Such feed is brought together with cracking catalyst particles to form a stream comprising a suspension of said particles in said feed in a progressive flow type reactor. This reactor includes an elongated reaction chamber and a disengagement chamber. The elongated reaction chamber comprises an outlet section having a longitudinal axis and is located at least in part within the disengagement chamber. There is an open downstream end in the outlet section which is located in the disengagement chamber. In accordance with the operating conditions of the RCC process, the above mentioned stream is caused to flow in the elongated reaction chamber towards the downstream end of the said outlet section for a vapor residence time in the range of up to about 10 seconds at a temperature of about 900° to about 1400° F. and under a total pressure of about 10 to about 50 pounds per square inch absolute. Such time, temperature and pressure are selected so as to be sufficient for causing a conversion per pass in the range of about 50% to about 90% while producing coke in amounts in the range of about 6 to about 14% by weight based on fresh feed, and laying down coke on the catalyst in amounts in the range of about 3% by weight.

According to the present invention, catalyst and product vapors in the above mentioned stream are discharged together from said elongated reaction zone through the downstream end of the above mentioned outlet section. At said downstream end, at least about 70%, preferably at least about 85%, and still more preferably at least about 90% by weight of the catalyst particles are projected along one or more discharge paths having a component or components of motion in the downstream direction, based on the direction of motion of said stream in said outlet section. Such path or paths extend generally in the direction of a downstream extension of said outlet section axis and/or extend in one or more directions divergent outwardly from said axis. Moreover, at least about 80%, more preferably at least about 90% and more preferably at least about 95% of the product vapors are projected from the downstream end of the outlet section as a stream or streams which diverge outwardly from the catalyst path or paths, along one or more paths that diverge outwardly from said axis.

The invention may, if desired, include interposing a barrier wall between the catalyst and the resultant product stream at a position closely adjacent to the downstream extremity of the elongated reaction chamber. Moreover, according to certain embodiments of the present invention, there is abrupt separation of catalyst from product vapors by projecting in the catalyst in a direction established by the elongated reaction chamber or an extension thereof, while the cracked products having lesser momentum, are caused to make an abrupt change of direction, resulting in an abrupt, substantially instantaneous ballistic separation of products from catalyst.

After an optional but definitely preferred stripping step to strip adsorbed hydrocarbons from the separated catalyst, the catalyst is regenerated with oxygen containing combustion-supporting gas under conditions of time, temperature and atmosphere sufficient to reduce the carbon on the catalyst to about 0.25 percent by weight or less, preferably about 0.1 percent by weight or less and still more preferably about 0.05 percent by weight or less, while forming combustion product gases comprising CO and/or $CO_2$. The regenerated catalyst may then be recycled to the elongated reaction chamber for contact with fresh feed. Depending on how the process of the invention is practised, one or more of the following additional advantages may be realized. If desired, and preferably, the process may be operated without added hydrogen in the reaction chamber. If desired, and preferably, the process may be operated without prior hydrotreating of the feed and/or without other process of removal of asphaltenes or metals from the feed, and this is true even where the carbometallic oil as a whole contains more than about 4, or more than about 5 or even more than about 5.5 ppm Nickel Equivalents by weight of heavy metal and has a carbon residue on pyrolysis greater than about 1% or greater than about 2% by weight. Moreover, all of the converter feed, as above described, may be cracked in one and the same conversion chamber. The cracking reaction may be carried out with a catalyst which has previously been used (recycled, except for such replacement as required to compensate for normal losses and deactivation) to crack a carbo-metallic feed under the above described conditions. Heavy hydrocarbons not cracked to gasoline in a first pass may be recycled with or without hydrotreating for further cracking in contact with the same kind of feed in which they were first subjected to cracking conditions, and under the same kind of conditions; but operation in a substantially once-through or single pass mode (e.g. less than about 15% by volume of recycle based on volume of fresh feed) is preferred.

As noted above, the apparatus aspect of this invention has wide utility, which is by no means limited to hydrocarbon conversion processes, but can be aptly illustrated by its application to such processes. For example the separation apparatus in one of its embodiments includes a shroud at least partially enclosing the outlet section of an elongated tubular member which functions as a reaction zone for the hydrocarbon cracking process. The shroud includes an outer wall spaced from the outlet section to form a collection flow passageway therebetween. The shroud also includes at least one outlet port in fluid communication with the collection flow passageway for transporting the hydrocarbon conversion products from the shroud. During operation, the hydrocarbon conversion products, under the influence of a negative pressure differential from the interior of the tubular reaction zone to the interior of the outlet port, exit the reaction zone through the outlet section and are directed through the shroud collection flow passageway and into the at least one outlet port, while the momentum of the solid catalyst particles prevents diversion of these particles into the shroud.

In order to achieve highest operating efficiencies for the gas-solid separation apparatus of the present invention, the shroud lip is preferably located in a zone extending from about 2D upstream to about 3D downstream the exit lip portion of the tubular member, wherein D constitutes the diameter of the exit lip portion. More preferably, the shroud lip located in a zone extending a distance D upstream and a distance D downstream the tubular member lip portion. Most preferably, the shroud lip is located substantially D/5 upstream from the outlet section lip portion. While only one outlet port is considered necessary, preferably a plurality of separate outlet ports each extend through the shroud wall assembly, with at least some of the outlet ports located at or upstream from the tubular member outlet section. Likewise, the shroud assembly preferably encloses the outlet section in a substantially cup-shaped member including a connecting wall exending outwardly from the outlet section into engagement with the shroud outer wall.

It has been further determined that the operating efficiency of the present invention is enhanced by including a target positioned downstream from the discharge end of the tubular member. Preferably, the target extends substantially perpendicular to the direction of flow through the outlet section and is located between ½D and 5D from the outlet section lip portion. More preferably, the target is located between D and 4D from the lip portion. Even more preferably, the target is spaced between 1.5D and 3D from the lip portion. Most preferably, the target is spaced substantially 2D from the lip portion, is of sufficient width to guide the catalyst particles outwardly from a center line of the flow stream and thereby away from the collection flow passageway at least partially encircling the outlet section.

The shape and size of the target may be varied as desired. Furthermore, while the target has proven to significantly increase the degree of solid-gas separation, the present invention is not limited to employment of such a target.

BEST AND OTHER ILLUSTRATIVE MODES FOR CARRYING OUT THE INVENTION

Figure 1:
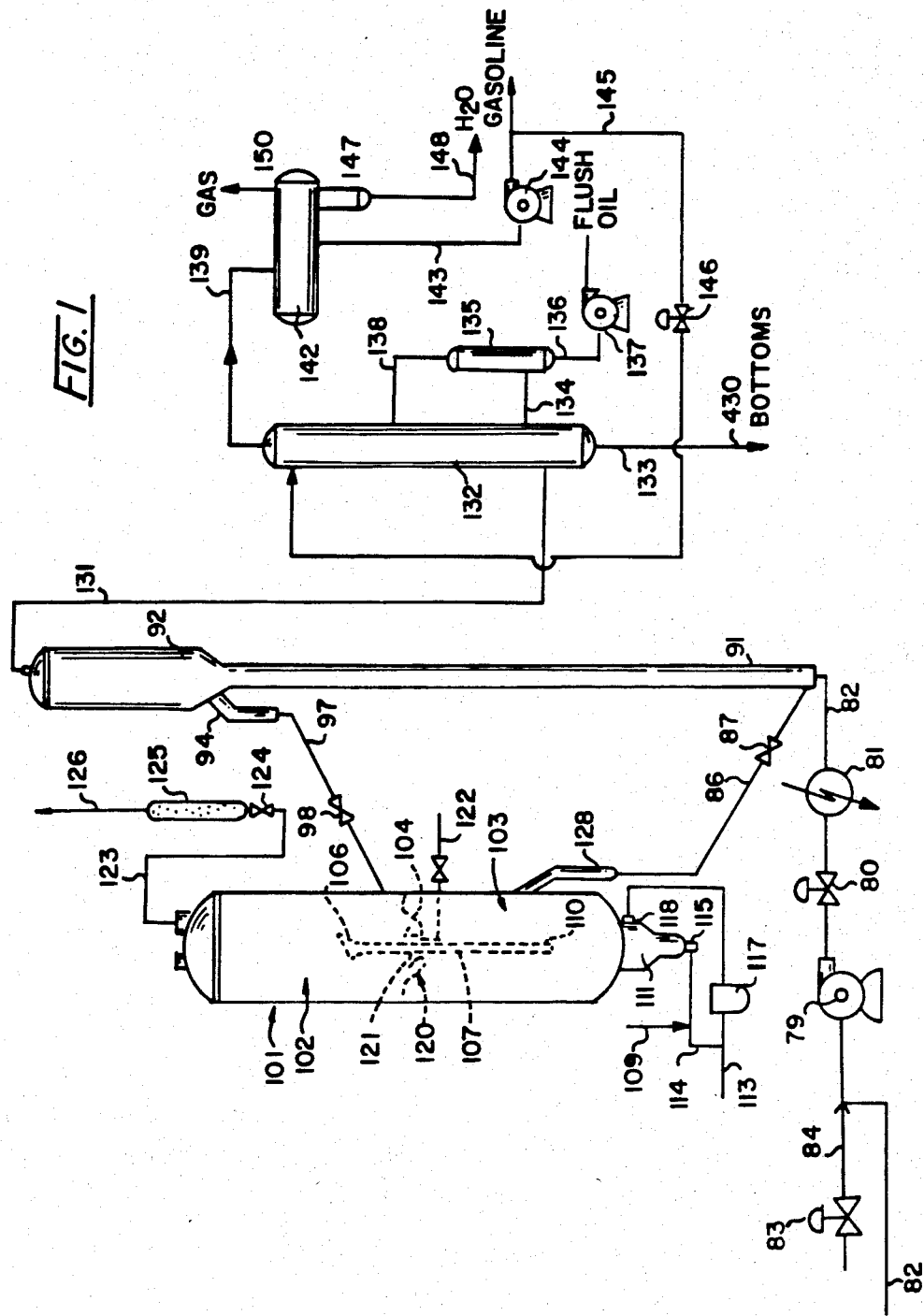
FIG. 1 is a schematic diagram of a reduced crude conversion unit for carrying out the process aspect of the present invention.

The present invention is applicable to virtually any kind of gas/solids separation, but finds particular usefulness in hydrocarbon conversion apparatus, such as for instance FCC units used to crack gas oils and RCC units used to convert carbo-metallic oils to a variety of liquid fuels, such as for instance gasoline and/or fuel oil. In its most preferred embodiment, the present invention provides a process for the continuous catalytic conversion of a wide variety of carbo-metallic oils to lower molecular weight products, while maximizing production of highly valuable liquid products, and making it possible, if desired, to avoid vacuum distillation and other expensive treatments such as hydrotreating. The term "oils", includes not only those predominantly hydrocarbon compositions which are liquid at room temperature (i.e., 68° F.), but also those predominantly hydrocarbon compositions which are asphalts or tars at ambient temperature but liquify when heated to temperatures in the range of up to about 800° F.

The invention is applicable to carbo-metallic oils, whether of petroleum origin or not. For example, provided they have the requisite boiling range, carbon residue on pyrolysis and heavy metals content, the invention may be applied to the processing of such widely diverse materials as heavy bottoms from crude oil, heavy bitumen crude oil, those crude oils known as "heavy crude" which approximate the properties of reduced crude, shale oil, tar sand extract, products from coal liquification and solvated coal, atmospheric and vacuum reduced crude, extracts and/or bottoms (raffinate) from solvent deasphalting, aromatic extract from lube oil refining, tar bottoms, heavy cycle oil, slop oil, other refinery waste streams and mixtures of the foregoing. Such mixtures can for instance be prepared by mixing available hydrocarbon fractions, including oils, tars, pitches and the like. Also, powdered coal may be suspended in the carbo-metallic oil. Persons skilled in the art are aware of techniques for demetalation of carbo-metallic oils, and demetalated oils may be converted using the invention; but it is an advantage of the invention that it can employ as feedstock carbo-metallic oils that have had no prior demetalation treatment. Likewise, the invention can be applied to hydrotreated feedstocks; but it is an advantage of the invention that it can successfully convert carbo-metallic oils which have had substantially no prior hydrotreatment. However, the preferred application of the process is to reduced crude, i.e., that fraction of crude oil boiling at and above 650° F., along or in admixture with virgin gas oils. While the use of material that has been subjected to prior vacuum distillation is not excluded, it is an advantage of the invention that it can satisfactorily process material which has had no prior vacuum distillation, thus saving on capital investment and operating costs as compared to conventional FCC processes that require a vacuum distillation unit.

In accordance with the invention one provides a carbo-metallic oil feedstock, at least about 70%, more preferably at least about 85% and still more preferably about 100% (by volume) of which boils at and above about 650° F. All boiling temperatures herein are based on standard atmospheric pressure conditions. In carbo-metallic oil partly or wholly composed of material which boils at and above about 650° F., such material is referred to herein as 650° F.+ material; and 650° F.+ material which is part of or has been separated from an oil containing component boiling above and below 650° F. may be referred to as a 650° F.+ fraction. But the terms "boils above" and "650° F.+" are not intended to imply that all of the material characterized by said terms will have the capability of boiling. The carbo-metallic oils contemplated by the invention may contain material which may not boil under any conditions; for example, certain asphalts and asphaltenes may crack thermally during distillation, apparently without boiling. Thus, for example, when it is said that the feed comprises at least about 70% by volume of material which boils above about 650° F., it should be understood that the 70% in question may include some material which will not boil or volatilize at any temperature. These non-boilable materials when present, may frequently or for the most part be concentrated in portions of the feed which do not boil below about 1000° F., 1025° F. or higher. Thus, when it is said that at least about 10%, more preferably about 15%, and still more preferably at least about 20% (by volume) of the 650° F.+ fraction will not boil below about 1000° F. or 1025° F., it should be understood that all or any part of the material not boiling below about 1000° F. or 1025° F., may or may not be volatile at and above the indicated temperatures.

Preferably, the contemplated feeds, or at least the 650° F.+ material therein, have a carbon residue on pyrolysis of at least about 2 or greater. For example, the Conradson carbon content may be in the range of about 2 to about 12 and most frequently at least about 4. A particularly common range is about 4 to about 8. Those feeds having a Conradson carbon content greater than about 6 may need special means for controlling excess heat in the regenerator.

Preferably, the feed has an average composition characterized by an atomic hydrogen to carbon ratio in the range of about 1.2 to about 1.9, and preferably about 1.3 to about 1.8.

The carbo-metallic feeds employed in accordance with the invention, or at least the 650° F.+ material therein, may contain at least about 4 parts per million of Nickel Equivalents, as defined above, of which at least about 2 parts per million is nickel (as metal, by weight). Carbo-metallic oils within the above range can be prepared from mixtures of two or more oils, some of which do and some of which do not contain the quantities of Nickel Equivalents and nickel set forth above. It should also be noted that the above values for Nickel Equivalents and nickel represent time-weighted averages for a substantial period of operation of the conversion unit, such as one month, for example. It should also be noted that the heavy metals have in certain circumstances exhibited some lessening of poisoning tendency after repeated oxidations and reductions on the catalyst, and the literature describes criteria for establishing "effective metal" values. For example, see the article by Cimbalo, et al., entitled "Deposited Metals Poison FCC Catalyst", *Oil and Gas Journal*, May 15, 1972, pp 112-122, the contents of which are incorporated herein by reference. If considered necessary or desirable, the contents of Nickel Equivalents and nickel in the carbo-metallic oils processed according to the invention may be expressed in terms of "effective metal" values. Notwithstanding the gradual reduction in poisoning activity noted by Cimbalo, et al., the regeneration of catalyst under normal FCC regeneration conditions may not, and usually does not, severely impair the dehydrogenation, demethanation and aromatic condensation activity of heavy metals accumulated on cracking catalyst.

It is known that about 0.2 to about 5 weight percent of "sulfur" in the form of elemental sulfur and/or its compounds (but reported as elemental sulfur based on the weight of feed) appears in FCC feeds and that the sulfur and modified forms of sulfur can find their way into the resultant gasoline product and, where lead is added, tend to reduce its susceptibility to octane enhancement. Sulfur in the product gasoline often requires sweetening when processing high sulfur containing crudes. To the extent that sulfur is present in the coke, it also represents a potential air pollutant since the regenerator burns it to $SO_2$ and $SO_3$. However, we have found that in our process the sulfur in the feed is on the other hand able to inhibit heavy metal activity by maintaining metals such as Ni, V, Cu and Fe in the sulfide form in the reactor. These sulfides are much less active than the metals themselves in promoting dehydrogenation and coking reactions. Accordingly, it is acceptable to carry out the invention with a carbo-metallic oil having at least about 0.3%, acceptably more than about 0.8% and more acceptably at least about 1.5% by weight of sulfur in the 650° F.+ fraction.

The carbo-metallic oils useful in the invention may and usually do contain significant quantities of heavy, high boiling compounds containing nitrogen, a substantial portion of which may be basic nitrogen. For example, the total nitrogen content of the carbo-metallic oils may be at least about 0.05% by weight. Since cracking catalysts owe their cracking activity to acid sites on the catalyst surface or in its pores, basic nitrogen-containing compounds may temporarily neutralize these sites, poisoning the catalyst. However, the catalyst is not permanently damaged since the nitrogen can be burned off the catalyst during regeneration, as a result of which the acidity of the active sites is restored.

The carbo-metallic oils may also include significant quantities of pentane insolubles, for example at least about 0.5% by weight, and more typically 2% or more or even about 4% or more. These may include for instance asphaltenes and other materials.

Alkali and alkaline earth metals generally do not tend to vaporize in large quantities under the distillation conditions employed in distilling crude oil to prepare the vacuum gas oils normally used as FCC feedstocks. Rather, these metals remain for the most part in the "bottoms" fraction (the non-vaporized high boiling portion) which may for instance be used in the production of asphalt or other by-products. However, reduced crude and other carbo-metallic oils are in many cases bottoms products, and therefore may contain significant quantities of alkali and alkaline earth metals such as sodium. These metals deposit upon the catalyst during cracking. Depending on the composition of the catalyst and magnitude of the regeneration temperatures to which it is exposed, these metals may undergo interactions and reactions with the catalyst (including the catalyst support) which are not normally experienced in processing VGO under conventional FCC processing conditions. If the catalyst characteristics and regeneration conditions so require, one will of course take the necessary precautions to limit the amounts of alkali and alkaline earth metal in the feed, which metals may enter the feed not only as brine associated with the crude oil in its natural state, but also as components of water or steam which are supplied to the cracking unit. Thus, careful desalting of the crude used to prepare the carbo-metallic feed may be important when the catalyst is particularly susceptible to alkali and alkaline earth metals. In such circumstances, the content of such metals (hereinafter collectively referred to as "sodium") in the feed can be maintained at about 1 ppm or less, based on the weight of the feedstock. Alternatively, the sodium level of the feed may be keyed to that of the catalyst, so as to maintain the sodium level of the catalyst which is in use substantially the same as or less than that of the replacement catalyst which is charged to the unit.

According to a particularly preferred embodiment of the invention, the carbo-metallic oil feedstock constitutes at least about 70% by volume of material which boils above about 650° F., and at least about 10% of the material which boils above about 650° F. will not boil below about 1025° F. The average composition of this 650° F.+ material may be further characterized by: (a) an atomic hydrogen to carbon ratio in the range of about 1.3 to about 1.8; (b) a Conradson carbon value of at least about 2; (c) at least about four parts per million of Nickel Equivalents, as defined above, of which at least about two parts per million is nickel (as metal, by weight); and (d) at least one of the following: (i) at least about 0.3% by weight of sulfur, (ii) at least about 0.05% by weight of nitrogen, and (iii) at least about 0.5% by weight of pentane insolubles. Very commonly, the preferred feed will include all of (i), (ii), and (iii), and other components found in oils of petroleum and non-petroleum origin may also be present in varying quantities providing they do not prevent operation of the process.

Although there is no intention of excluding the possibility of using a feedstock which has previously been subjected to some cracking, the present invention has the definite advantage that it can successfully produce large conversions and very substantial yields of liquid hydrocarbon fuels from carbo-metallic oils which have not been subjected to any substantial amount of cracking. Thus, for example, and preferably, at least about 85%, more preferably at least about 90% amd most preferably substantially all of the carbo-metallic feed introduced into the present process is oil which has not previously been contacted with cracking catalyst under cracking conditions. Moreover, the process of the invention is suitable for operation in a substantially once-through or single pass mode. Thus, the volume of recycle, if any, based on the volume of fresh feed is preferably about 15% or less and more preferably about 10% or less.

In general, the weight ratio of catalyst to fresh feed (feed which has not previously been exposed to cracking catalyst under cracking conditions) used in the process is in the range of about 3 to about 18. Preferred and more preferred ratios are about 4 to about 12, more preferably about 5 to about 10 and still more preferably about 6 to about 10, a ratio of about 10 presently being considered most nearly optimum. Within the limitations of product quality requirements, controlling the catalyst to oil ratio at relatively low levels within the aforesaid ranges tends to reduce the coke yield of the process, based on fresh feed.

In conventional FCC processing of VGO, the ratio between the number of barrels per day of plant through-put and the total number of tons of catalyst undergoing circulation throughout all phases of the process can vary widely. For purposes of this disclosure, daily plant through-put is defined as the number of barrels of fresh feed boiling above about 650° F. which that plant processes per average day of operation to liquid products boiling below about 430° F.

The present invention may be practiced in the range of about 2 to about 30 tons of catalyst inventory per 1000 barrels of daily plant through-put. Based on the objective of maximizing contact of feed with fresh catalyst, it has been suggested that operating with about 2 to about 5 or even less than 2 tons of catalyst inventory per 1000 barrels of daily plant through-put is desirable when operating with carbo-metallic oils. However, in view of disclosures in "Deposited Metals Poison FCC Catalyst", Cimbalo, et al., op ct., one may be able, at a given rate of catalyst replacement, to reduce effective metals levels on the catalyst by operating with a higher inventory, say in the range of about 12 to about 20 tons per 1000 barrels of daily through-put capacity.

In the practice of the invention, catalyst may be added continuously or periodically, such as, for example, to make up for normal losses of catalyst from the system. Moreover, catalyst addition may be conducted in conjunction with withdrawal of catalyst, such as, for example, to maintain or increase the average activity level of the catalyst in the unit. For example, the rate at which virgin catalyst is added to the unit may be in the range of about 0.1 to about 3, more preferably about 0.15 to about 2, and most preferably to about 0.2 to about 1.5 pounds per barrel of feed. If on the other hand equilibrium catalyst from FCC operation is to be utilized, replacement rates as high as about 5 pounds per barrel can be practiced.

Where circumstances are such that the catalyst employed in the unit is below average in resistance to deactivation and/or conditions prevailing in the unit are such as to promote more rapid deactivation, one may employ rates of addition greater than those stated above; but in the opposite circumstances, lower rates of addition may be employed. By way of illustration, if a unit were operated with a metal(s) loading of 5000 ppm Ni+V in parts by weight on equilibrium catalyst, one might for example employ a replacement rate of about 2.7 pounds of catalyst introduced for each barrel (42 gallons) of feed processed. However, operation at a higher level such as 10,000 ppm Ni+V on catalyst would enable one to substantially reduce the replacement rate, such as for example to about 1.3 pounds of catalyst per barrel of feed. Thus, the levels of metal(s) on the catalyst and catalyst replacement rates may in general be respectively increased and decreased to any value consistent with the catalyst activity which is available and desired for conducting the process.

Without wishing to be bound by any theory, it appears that a number of features of the process to be described in greater detail below, such as, for instance, the residence time and optional mixing of steam with the feedstock, tend to restrict the extent to which cracking conditions produce metals in the reduced state on the catalyst from heavy metal sulfide(s), sulfate(s) or oxide(s) deposited on the catalyst particles by prior exposures of carbo-metallic feedstocks and regeneration conditions. Thus, the process appears to afford significant control over the poisoning effect of heavy metals on the catalyst even when the accumulations of such metals are quite substantial.

Accordingly, the process may be practiced with catalyst bearing accumulations of heavy metal(s) in the form of elemental metal(s), oxide(s), sulfide(s) or other compounds which heretofore would have been considered quite intolerable in conventional FCC-VGO operations. Thus, operation of the process with catalyst bearing heavy metals accumulations in the range of about 3,000 or more ppm Nickel Equivalents, on the average, is contemplated. The concentration of Nickel Equivalents of metals on catalyst can range up to about 50,000 ppm or higher. More specifically, the accumulation may be in the range of about 3,000 to about 30,000 ppm, preferably in the range of 3,000 to 20,000 ppm, and more preferably about 3,000 to about 12,000 ppm. Within these ranges just mentioned, operation at metals levels of about 4,000 or more, about 5,000 or more, or about 7,000 or more ppm can tend to reduce the rate of catalyst replacement required. The foregoing ranges are based on parts per million of Nickel Equivalents, in which the metals are expressed as metal, by weight, measured on and based on regenerated equilibrium catalyst. However, in the event that catalyst of adequate activity is available at very low cost, making feasible very high rates of catalyst replacement, the carbo-metallic oil could be converted to lower boiling liquid products with catalyst bearing less than 3,000 ppm Nickel Equivalents of heavy metals. For example, one might employ equilibrium catalyst from another unit, for example, an FCC unit which has been used in the cracking of a feed, e.g. vacuum gas oil, having a carbon residue on pyrolysis of less than 1 and containing less than about 4 ppm Nickel Equivalents of heavy metals.

The invention described in this specification may be employed in the processes and apparatuses for carbo-metallic oil conversion described in U.S. Pat. Nos. 4,299,687; 4,332,673; 4,341,624; 4,347,122; 4,354,923; 4,376,696; 4,375,404; 4,376,038; said Patents being in the name of George D. Myers alone or jointly with Lloyd E. Busch and assigned or to be assigned to Ashland Oil, Inc., and the entire disclosure of each of said applications being incorporated herein by reference. While the processes described in these applications can handle reduced crudes or crude oils containing high metals and Conradson carbon values not susceptible previously to direct processing, certain crudes such as Mexican Mayan or Venezuelan and certain other types of oil feeds contain abnormally high heavy metals and Conradson carbon values. If these very poor grades of oil are processed in a carbo-metallic process, they may lead to uneconomical operations because of high heat loads on the regenerator and/or high catalyst addition rates to maintain adequate catalyst activity and/or selectivity. In order to improve the grade of very poor grades of oil, such as those containing more than 50 ppm heavy metals and/or more than 8 weight percent Conradson carbon and preferably more than 100 ppm heavy metals and/or more than 10 weight percent Conradson carbon, these oils may be pretreated with a sorbent to reduce the levels of these contaminants to the aforementioned or lower values. Such upgrading processes are described in U.S. Pat. No. 4,263,128 of Apr. 21, 1981, in the name of David B. Bartholic, the entire disclosure of said patent being incorporated herein by reference.

In any event, the equilibrium concentration of heavy metals in the circulating inventory of catalyst can be controlled (including maintained or varied as desired or needed) by manipulation of the rate of catalyst addition discussed above. Thus, for example, addition of catalyst may be maintained at a rate which will control the heavy metals accumulation on the catalyst in one of the ranges set forth above.

In general, it is preferred to employ a catalyst having a relatively high level of cracking activity, providing high levels of conversion and productivity at low residence times. The conversion capabilities of the catalyst may be expressed in terms of the conversion produced during actual operation of the process and/or in terms of conversion produced in standard catalyst activity tests. For example, it is preferred to employ catalyst which, in the course of extended operation under prevailing process conditions, is sufficiently active for sustaining a level of conversion of at least about 50% and more preferably at least about 60%. In this connection, conversion is expressed in liquid volume percent, based on fresh feed.

Also, for example, the preferred catalyst may be defined as one which, in its virgin or equilibrium state, exhibits a specified activity expressed as a percentage in terms of MAT (micro-activity test) conversion. For purposes of the present invention the foregoing percentage is the volume percentage of standard feedstock which a catalyst under evaluation will convert to 430° F. end point gasoline, lighter products and coke at 900° F., 16 WHSV (weight hourly space velocity, calculated on a moisture free basis, using clean catalyst which has been dried at 1100° F., weighed and then conditioned, for a period of at least 8 hours at about 25° C. and 50% relative humidity, until about one hour or less prior to contacting the feed) and 3C/O (catalyst to oil weight ratio) by ASTM D-32 MAT test D-3907-80, using an appropriate standard feedstock, e.g. a sweet light primary gas oil, such as that used by Davison, Division of W. R. Grace, having the following analysis and properties:

| | |
|---|---|
| API Gravity at 60° F., degrees | 31.0 |
| Specific Gravity at 60° F., g/cc | 0.8708 |
| Ramsbottom Carbon, wt. % | 0.09 |
| Conradson Carbon, wt. % | 0.04 |
| Carbon, wt. % | 84.92 |
| Hydrogen, wt. % | 12.94 |
| Sulfur, wt. % | 0.68 |
| Nitrogen, ppm | 305 |
| Viscosity at 100° F., centistokes | 10.36 |
| Watson K Factor | 11.93 |
| Aniline Point | 182 |
| Bromine No. | 2.2 |
| Paraffins, Vol. % | 31.7 |
| Olefins, Vol. % | 1.6 |
| Naphthenes, Vol. % | 44.0 |
| Aromatics, Vol. % | 22.7 |
| Average Molecular Weight | 284 |
| Nickel | Trace |
| Vanadium | Trace |
| Iron | Trace |
| Sodium | Trace |
| Chlorides | Trace |
| B S & W | Trace |

| Distillation | ASTM D-1160 |
|---|---|
| IBP | 445 |
| 10% | 601 |
| 30% | 664 |
| 50% | 701 |
| 70% | 734 |
| 90% | 787 |
| FBP | 834 |

The gasoline end point and boiling temperature-volume percent relationships of the product produced in the MAT conversion test may for example be determined by simulated distillation techniques, for example modifications of gas chromate graphic "Sim-D", ASTM D-2887-73. The results of such simulations are in reasonable agreement with the results obtained by subjecting larger samples of material to standard laboratory distillation techniques. Conversion is calculated by subtracting from 100 the volume percent (based on fresh feed) of those products heavier than gasoline which remain in the recovered product.

On pages 935-937 of Hougen and Watson, *Chemical Process Principles*, John Wiley & Sons, Inc., N.Y. (1947), the concept of "Activity Factors" is discussed. This concept leads to the use of "relative activity" to compare the effectiveness of an operating catalyst against a standard catalyst. Relative activity measurements facilitate recognition of how the quantity requirements of various catalysts differ from one another. Thus, relative activity is a ratio obtained by dividing the weight of a standard or reference catalyst which is or would be required to produce a given level of conversion, as compared to the weight of an operating catalyst (whether proposed or actually used) which is or would be required to produce the same level of conversion in the same or equivalent feedstock under the same or equivalent conditions. Said ratio of catalyst weights may be expressed as a numerical ratio, but preferably is converted to a percentage basis. The standard catalyst is preferably chosen from among catalysts useful for conducting the present invention, such as for example zeolite fluid cracking catalysts, and is chosen for its ability to produce a predetermined level of conversion in a standard feed under the conditions of temperature, WHSV, catalyst to oil ratio and other conditions set forth in the preceding description of the MAT conversion test and in ASTM D-32 MAT test D-3907-80. Conversion is the volume percentage of feedstock that is converted to 430° F. end point gasoline, lighter products and coke. For standard feed, one may employ the above-mentioned light primary gas oil, or equivalent.

For purposes of conducting relative activity determinatios, one may prepare a "standard catalyst curve", a chart or graph of conversion (as above defined) vs. reciprocal WHSV for the standard catalyst and feedstock. A sufficient number of runs is made under ASTM D-3907-80 conditions (as modified above) using standard feedstock at varying levels of WHSV to prepare an accurate "curve" of conversion vs. WHSV for the standard feedstock. This curve should traverse all or substantially all of the various levels of conversion including the range of conversion within which it is expected that the operating catalyst will be tested. From this curve, one may establish a standard WHSV for test comparisons and a standard value of reciprocal WHSV corresponding to that level of conversion which has been chosen to represent 100% relative activity in the standard catalyst. For purposes of the present disclosure the aforementioned reciprocal WHSV and level of conversion are, respectively, 0.0625 and 75%. In testing an operating catalyst of unknown relative activity, one conducts a sufficient number of runs with that catalyst under D-3907-80 conditions (as modified above) to establish the level of conversion which is or would be produced with the operating catalyst at standard reciprocal WHSV. Then, using the above-mentioned standard catalyst curve, one establishes a hypothetical reciprocal WHSV constituting the reciprocal WHSV which would have been required, using the standard catalyst, to obtain the same level of conversion which was or would be exhibited, by the operating catalyst at standard WHSV. The relative activity may then be calculated by dividing the hypothetical reciprocal WHSV by the reciprocal standard WHSV, which is 1/16, or 0.0625. The result is relative activity expressed in terms of a decimal fraction, which may then be multiplied by 100 to convert to percent relative activity. In applying the results of this determination, a relative activity of 0.5, or 50%, means that it would take twice the amount of the operating catalyst to give the same conversion as the standard catalyst, i.e., the production catalyst is 50% as active as the reference catalyst. The catalyst may be introduced into the process in its virgin form or, as previously indicated, in other than virgin form; e.g. one may use equilibrium catalyst withdrawn from another unit, such as catalyst that has been employed in the cracking of a different feed. Whether characterized on the basis of MAT conversion activity or relative activity, the preferred catalysts may be described on the basis of their activity "as introduced" into the process of the present invention, or on the basis of their "as withdrawn" or equilibrium activity in the process of the present invention, or on both of these bases. A preferred activity level of virgin and non-virgin catalyst "as introduced" into the process of the present invention is at least about 60% by MAT conversion, and preferably at least about 20%, more preferably at least about 40% and still more preferably at least about 60% in terms of relative activity. However, it will be appreciated that, particularly in the case of non-virgin catalysts supplied at high addition rates, lower activity levels may be acceptable. An acceptable "as withdrawn" or equilibrium activity level of catalyst which has been used in the process of the present invention is at least about 20% or more, but about 40% or more and preferably about 60% or more are preferred values on a relative activity basis, and an activity level of 60% or more on a MAT conversion basis is also contemplated. More preferably, it is desired to employ a catalyst which will, under the conditions of use in the unit, establish an equilibrium activity at or above the indicated level. The catalyst activities are determined with catalyst having less than 0.01 coke, e.g. regenerated catalyst.

One may employ any hydrocarbon cracking catalyst having the above indicated conversion capabilities. A particularly preferred class of catalysts includes those which have pore structures into which molecules of feed material may enter for adsorption and/or for contact with active catalytic sites within or adjacent the pores. Various types of catalysts are available within this classification, including for example the layered silicates, e.g. smectites. Although the most widely available catalysts within this classification are the well-known zeolite-containing catalysts, non-zeolite catalysts are also contemplated.

The preferred zeolite-containing catalysts may include any zeolite, whether natural, semi-synthetic or synthetic, alone or in admixture with other materials which do not significantly impair the suitability of the catalyst, provided the resultant catalyst has the activity and pore structure referred to above. For example, if the virgin catalyst is a mixture, it may include the zeolite component associated with or dispersed in a porous refractory inorganic oxide carrier, in such case the catalyst may for example contain about 1% to about 60%, more preferably about 15 to about 50%, and most typically about 20 to about 45% by weight, based on the total weight of catalyst (water free basis) of the zeolite, the balance of the catalyst being the porous refractory inorganic oxide alone or in combination with any of the known adjuvants for promoting or suppressing various desired and undesired reactions. For a general explanation of the genus of zeolite, molecular sieve catalysts useful in the invention, attention is drawn to the disclosures of the articles entitled "Refinery Catalysts Are a Fluid Business" and "Making Cat Crackers Work on Varied Diet", appearing respectively in the July 26, 1978 and Sept. 13, 1978 issues of Chemical Week magazine. The descriptions of the aforementioned publications are incorporated herein by reference.

For the most part, the zeolite components of the zeolite-containing catalysts will be those which are known to be useful in FCC cracking processes. In general, these are crystalline aluminosilicates, typically made up of tetra coordinated aluminum atoms associated through oxygen atoms with adjacent silicon atoms in the crystal structure. However, the term "zeolite" as used in this disclosure contemplates not only aluminosilicates, but also substances in which the aluminum has been partly or wholly replaced, such as for instance by gallium and/or other metal atoms, and further includes substances in which all or part of the silicon has been replaced, such as for instance by germanium. Titanium and zirconium substitution may also be practiced.

Most zeolites are prepared or occur naturally in the sodium form, so that sodium cations are associated with the electronegative sites in the crystal structure. The sodium cations tend to make zeolites inactive and much less stable when exposed to hydrocarbon conversion conditions, particularly high temperatures. Accordingly, the zeolite may be ion exchanged, and where the zeolite is a component of a catalyst composition, such ion exchanging may occur before or after incorporation of the zeolite as a component of the composition. Suitable cations for replacement of sodium in the zeolite crystal structure include ammonium (decomposable to hydrogen), hydrogen, rare earth metals, alkaline earth metals, etc. Various suitable ion exchange procedures and cations which may be exchanged into the zeolite crystal structure are well known to those skilled in the art.

Examples of the naturally occurring crystalline aluminosilicate zeolites which may be used as or included in the catalyst for the present invention are faujasite, mordenite, clinoptilote, chabazite, analcite, crionite, as well as levynite, dachiardite, paulingite, noselite, ferriorite, heulandite, scolccite, stibite, harmotome, phillipsite, brewsterite, flarite, datolite, gmelinite, caumnite, leucite, lazurite, scaplite, mesolite, ptolite, nephline, matrolite, offretite and sodalite.

Examples of the synthetic crystalline aluminosilicate zeolites which are useful as or in the catalyst for carrying out the present invention are Zeolite X, U.S. Pat. No. 2,882,244; Zeolite Y, U.S. Pat. No. 3,130,007; and Zeolite A, U.S. Pat. No. 2,882,243; as well as Zeolite B, U.S. Pat. No. 3,008,803; Zeolite D, Canada Pat. No. 661,981; Zeolite E, Canada Pat. No. 614,495; Zeolite F, U.S. Pat. No. 2,996,358; Zeolite H, U.S. Pat. No. 3,010,789; Zeolite J. U.S. Pat. No. 3,011,869; Zeolite L, Belgian Pat. No. 575,177; Zeolite M, U.S. Pat. No. 2,995,423; Zeolite O, U.S. Pat. No. 3,140,252; Zeolite Q, U.S. Pat. No. 2,991,151; Zeolite S, U.S. Pat. No. 3,054,657; Zeolite T, U.S. Pat. No. 2,950,952; Zeolite W, U.S. Pat. No. 3,012,853; Zeolite Z, Canada Pat. No. 614,495; and Zeolite Omega, Canada Pat. No. 817,915. Also, ZK-4HJ, alpha beta and ZSM-type zeolites are useful. Moreover, the zeolites described in U.S. Pat. Nos. 3,140,249; 3,140,253; 3,944,482; and 4,137,151 are also useful, the disclosures of said patents being incorporated herein by reference.

The crystalline aluminosilicate zeolites having a faujasite-type crystal structure are particularly preferred for use in the present invention. This includes particularly natural faujasite and Zeolite X and Zeolite Y.

The crystalline aluminosilicate zeolites, such as synthetic faujasite, will under normal conditions crystallize as regularly shaped, discrete particles of about one to about ten microns in size, and, accordingly, this is the size range frequently found in commerical catalysts which can be used in the invention. Preferably, the particle size of the zeolites is from about 0.1 to about 10 microns and more preferably is from about 0.1 to about 2 microns or less. For example, zeolites prepared in situ from calcined kaolin may be characterized by even smaller crystallites. Crystalline zeolites exhibit both an interior and an exterior surface area, the latter being defined as "portal" surface area, with the largest portion of the total surface area being internal. By portal surface area, we refer to the outer surface of the zeolite crystal through which reactants are considered to pass in order to convert to lower boiling products. Blockages of the internal channels by, for example, coke formation, blockages of entrance to the internal channels by deposition of coke in the portal surface area, and contamination by metals poisoning, will greatly reduce the total zeolite surface area. Therefore, to minimize the effect of contamination and pore blockage, crystals larger than the normal size cited above are preferably not used in the catalysts of this invention.

Commercial zeolite-containing catalysts are available with carriers containing a variety of metal oxides and combination thereof, include for example silica, alumina, magnesia, and mixtures thereof and mixtures of such oxides with clays as e.g. described in U.S. Pat. No. 3,034,948. One may for example select any of the zeolite-containing molecular sieve fluid cracking catalysts which are suitable for production of gasoline from vacuum gas oils. However, certain advantages may be attained by judicious selection of catalysts having marked resistance to metals. A metal resistant zeolite catalyst is, for instance, described in U.S. Pat. No. 3,944,482, in which the catalyst contains 1–40 weight percent of a rare earth-exchanged zeolite, the balance being a refractory metal oxide having specified pore volume and size distribution. Other catalysts described as "metals-tolerant" are described in the above mentioned cimbala, et al., article.

In general, it is preferred to employ catalysts having an overall particle size in the range of about 5 to about 160, more preferably about 40 to about 120, and most preferably about 40 to about 80 microns. For example, a useful catalyst may have a skeletal density of about 150 pounds per cubic foot and an average particle size of about 60–70 microns, with less than 10% of the particles having a size less than about 40 microns and less than 80% having a size less than about 50–60 microns.

Although a wide variety of other catalysts, including both zeolite-containing and non-zeolite-containing may be employed in the practice of the invention the following are examples of commercially available catalysts which may be employed in practicing the invention:

TABLE 1

|  | Specific Surface $m^2/g$ | Weight Percent | | | | | |
|---|---|---|---|---|---|---|---|
|  |  | Zeolite Content | $Al_2O_3$ | $SiO_2$ | $Na_2O$ | $Fe_2O$ | $TiO_2$ |
| AGZ-290 | 300 | 11.0 | 29.5 | 59.0 | 0.40 | 0.11 | 0.59 |
| GRZ-1 | 162 | 14.0 | 23.4 | 69.0 | 0.10 | 0.4 | 0.9 |
| CCZ-220 | 129 | 11.0 | 34.6 | 60.0 | 0.60 | 0.57 | 1.9 |
| Super DX | 155 | 13.0 | 31.0 | 65.0 | 0.80 | 0.57 | 1.6 |

TABLE 1-continued

|  | Specific Surface m²/g | Weight Percent | | | | | |
| --- | --- | --- | --- | --- | --- | --- | --- |
|  |  | Zeolite Content | Al₂O₃ | SiO₂ | Na₂O | Fe₂O | TiO₂ |
| F-87 | 240 | 10.0 | 44.0 | 50.0 | 0.80 | 0.70 | 1.6 |
| FOX-90 | 240 | 8.0 | 44.0 | 52.0 | 0.65 | 0.65 | 1.1 |
| HFZ 20 | 310 | 20.0 | 59.0 | 40.0 | 0.47 | 0.54 | 2.75 |
| HEZ 55 | 210 | 19.0 | 59.0 | 35.2 | 0.60 | 0.60 | 2.5 |

The AGZ-290, GRZ-1, CCZ-220 and Super DX catalysts referred to above are products of W. R. Grace and Co. F-87 and FOC-90 are products of Filtrol, while HFZ-20 and HEZ-55 are products of Engelhard/Houdry. The above are properties of virgin catalyst and, except in the case of zeolite content, are adjusted to a water free basis, i.e. based on material ignited at 1750° F. The zeolite content is derived by comparison of the X-ray intensities of a catalyst sample and of a standard material composed of high purity sodium Y zeolite in accordance with draft #6, dated Jan. 9, 1978, of proposed ASTM Standard Method entitled "Determination of the Faujasite Content of a Catalyst".

Among the above mentioned commercially available catalysts, the Super D family and especially a catalyst designated GRZ-1 are particularly preferred. For example, Super DX has given particularly good results with Arabian light crude. The GRZ-1, although substantially more expensive than the Super DX at present, appears somewhat more metals-tolerant.

Although not yet commercially available, it is believed that the best catalysts for carrying out the present invention are those which are characterized by matrices with feeder pores having large minimum diameters and large mouths to facilitate diffusion of high molecular weight molecules through the matrix to the portal surface area of molecular sieve particles within the matrix. Such matrices preferably also have a relatively large pore volume in order to soak up unvaporized portions of the carbo-metallic oil feed. Thus significant numbers of liquid hydrocarbon molecules can diffuse to active catalytic sites both in the matrix and in sieve particles on the surface of the matrix. In general it is preferred to employ catalysts having a total pore volume greater than 0.2 cc/gm, preferably at least 0.4 cc/gm, more preferably at least 0.6 cc/gm and most preferably in the range of 0.7 to 1.0 cc/m, and with matrices wherein at least 0.1 cc/gm, and preferably at least 0.2 cc/gm, of said total pore volume is comprised of feeder pores having diameters in the range of about 400 to about 6000 Angstrom units, more preferably in the range of about 1000 to about 6000 angstrom units. These catalysts and the method for making the same are described more fully in copending international application Ser. No. PCT/US81/00492 filed in the U.S. Receiving Office on Apr. 10, 1981, in the names of Ashland Oil, Inc., et al., and entitled "Large Pore Catalysts for Heavy Hydrocarbon Conversion", the entire disclosure of said application being incorporated herein by reference.

Catalysts for carrying out the present invention may also employ other metal additives for controlling the adverse effects of vanadium as described in PCT International Application Ser. No. PCT/US81/00356 filed in the U.S. Receiving Office on Mar. 19, 1981, in the names of Ashland Oil, Inc., et al., and entitled "Immobilization of Vanadia Deposited on Catalytic Materials During Carbo-Metallic Oil Conversion". The manner in which these other metal additives are believed to interact with vanadium is set forth in said PCT international application, the entire disclosure fo which is incorporated herein by reference. Certain of the additive metal compounds disclosed in this referenced PCT application, particularly those of titanium and zirconium, will also passivate nickel, iron and copper. The passivating mechanism of titanium and zirconium on nickel, iron and copper is believed to be similar to that of aluminum and silicon, namely, an oxide and/or spinel coating may be formed. Where the additive is introduced directly into the conversion process, that is into the riser, into the regenerator or into any intermediate components, the additive is preferably an organo-metallic compound of titanium or zirconium soluble in the hydrocarbon feed or in a hydrocarbon solvent miscible with the feed. Examples of preferred organo-metallic compounds of these metals are tetraisopropyltitanate, TI $(C_3H_7O)_4$, available as TYZOR from the Du Pont Company; zirconium isopropoxide, Zr $(C_3H_7O)_4$; and zirconium 2,4-pentanedionate-Zr $(C_5H_7O_2)_4$. These organo-metallics are only a partial example of the various types available and others would include alcoholates, esters, phenolates, naphthenates, carboxylates, dienyl sandwich compounds, and the like. Other preferred process additives include titanium tetrachloride, zirconium tetrachloride and zirconium acetate, and the water soluble inorganic salts of these metals, including the sulfates, nitrates and chlorides, which are relatively inexpensive.

Because the atomic weight of zirconium differs relative to the atomic weights of nickel and vanadium, while that of titanium is about the same, a 1:1 atomic ratio is equivalent to about a 1.0 weight ratio of titanium to nickel plus vanadium, and to about a 2.0 weight ratio of zirconium to nickel plus vanadium. Multiples of the 1:1 atomic ratio require the same multiple of the weight ratio. For example a 2:1 atomic ratio requires about a 2.0 titanium weight ratio and about a 4.0 zirconium weight ratio.

Additives may be introduced into the riser, the regenerator or other conversion system components to passivate the non-selective catalytic activity of heavy metals deposited on the conversion catalyst. Preferred additives for practicing the present invention include those disclosed in U.S. Pat. No. 4,454,025, filed in the name of William P. Hettinger, Jr., and entitled PASSIVATING HEAVY METALS IN CARBO-METALLIC OIL CONVERSION, the entire disclosure of said U.S. application being incorporated herein by reference.

A particularly preferred catalyst also includes vanadium traps as disclosed in U.S. patent application Ser. No. 252,967 filed Apr. 10, 1981, in the names of William P. Hettinger, Jr., et al., and entitled "Trapping of Metals Deposited on Catalytic Materials During Carbo-Metallic Oil Conversion". It is also preferred to control the valence state of vanadium accumulations on the catalyst during regeneration as disclosed in the U.S. Patent Application entitled "Immobilization of Vanadium Deposited on Catalytic Materials During Carbo-Metallic Oil Conversion" filed in the names of William P. Hettinger, Jr., et al., on Apr. 20, 1981, as well as the continuation-in-part of the same application subsequently filed on Apr. 28, 1981. The entire disclosures of said U.S. Patent Applications are incorporated herein by reference. It is considered an advantage that the process of the present invention can be conducted in the substantial absence of tin and/or antimony or at least in the presence of a catalyst which is substantially free of either or both of these metals.

The process of the present invention may be operated with the above described carbo-metallic oil and catalyst as substantially the sole materials charged to the reaction zone, although charging of additional materials is not excluded. The charging of recycled oil to the reaction zone has already been mentioned. As described in greater detail below, still other materials fulfilling a variety of functions may also be charged. In such case, the carbo-metallic oil and catalyst usually represent the major proportion by weight of the total of all materials charged to the reaction zone.

Certain of the additional materials which may be used perform functions which offer significant advantages over the process as performed with only the carbo-metallic oil and catalyst. Among these functions are: controlling the effects of heavy metals and other catalyst contaminants; enhancing catalyst activity; absorbing excess heat in the catalyst as received from the regenerator; disposal of pollutants or conversion thereof to a form or forms in which they may be more readily separated from products and/or disposed of; controlling catalyst temperature; diluting the carbo-metallic oil vapors to reduce their partial pressure and increase the yield of desired products; adjusting feed/catalyst contact time; donation of hydrogen to a hydrogen deficient carbo-metallic oil feedstock for example as disclosed in Pat. No. 4,376,308, entitled "Use of Naphtha in Carbo-Metallic Oil Conversion", filed in the name of George D. Myers on Mar. 23, 1981, which application is incorporated herein by reference; assisting in the dispersion of the feed; and possibly also distillation of products. Certain of the metals in the heavy metals accumulation on the catalyst are more active in promoting undesired reactions when they are in the form of elemental metal, than they are when in the oxidized form produced by contact with oxygen in the catalyst regenerator. However, the time of contact between catalyst and vapors of feed and product in past conventional catalytic cracking was sufficient so that hydrogen released in the cracking reaction was able to reconvert a significant portion of the less harmful oxides back to the more harmful elemental heavy metals. One can take advantage of this situation through the introduction of additional materials which are in gaseous (including vaporous) form in the reaction zone in admixture with the catalyst and vapors of feed and products. The increased volume of material in the reaction zone resulting from the presence of such additional materials tend to increase the velocity of flow through the reaction zone with a corresponding decrease in the residence time of the catalyst and oxidized heavy metals borne thereby. Because of this reduced residence time, there is less opportunity for reduction of the oxidized heavy metals to elemental form and therefore less of the harmful elemental metals are available for contacting the feed and products.

Added materials may be introduced into the process in any suitable fashion, some examples of which follow. For instance, they may be admixed with the carbo-metallic oil feedstock prior to contact of the latter with the catalyst. Alternatively, the added materials may, if desired, be admixed with the catalyst prior to contact of the latter with the feedstock. Separate portions of the added materials may be separately admixed with both catalyst and carbo-metallic oil. Moreover, the feedstock, catalyst and additional materials may, if desired, be brought together substantially simultaneously. A portion of the added materials may be mixed with catalyst and/or carbo-metallic oil in any of the above described ways, while additional portions are subsequently brought into admixture. For example a portion of the added materials may be added to the carbo-metallic oil and/or to the catalyst before they reach the reaction zone, while another portion of the added materials is introduced directly into the reaction zone. The added materials may be introduced at a plurality of spaced locations in the reaction zone or along the length thereof, if elongated.

The amount of additional materials which may be present in the feed, catalyst or reaction zone for carrying out the above functions, and others, may be varied as desired; but said amount will preferably be sufficient to substantially heat balance the process. These materials may for example be introduced into the reaction zone in a weight ratio relative to feed of up to about 0.4, preferably in the range of about 0.02 to about 0.4, more preferably about 0.03 to about 0.3 and most preferably about 0.05 to about 0.25.

For example, many or all of the above desirable functions may be attained by introducing $H_2O$ to the reaction zone in the form of steam or of liquid water or a combination thereof in a weight ratio relative to feed in the range of about 0.04 or more, or more preferably about 0.05 to about 0.1 or more. Without wishing to be bound by any theory, it appears that the use of $H_2O$ tends to inhibit reduction of catalyst-borne oxides, sulfites and sulfides to the free metallic form which is believed to promote condensation-dehydrogenation with consequent promotion of coke and hydrogen yield and accompanying loss of product. Moreover, $H_2O$ may also, to some extent, reduce deposition of metals onto the catalyst surface. There may also be some tendency to desorb nitrogen-containing and other heavy contaminant-containing molecules from the surface of the catalyst particles, or at least some tendency to inhibit their absorption by the catalyst. It is also believed that added $H_2O$ tends to increase the acidity of the catalyst by Bronsted acid formation which in turn enhances the activity of the catalyst. Assuming the $H_2O$ as supplied is cooler than the regenerated catalyst and/or the temperature of the reaction zone, the sensible heat involved in raising the temperature of the $H_2O$ upon contacting the catalyst in the reaction zone or elsewhere can absorb excess heat from the catalyst. Where the $H_2O$ is or includes recycled water that contains for example about 500 to about 5000 ppm of $H_2S$ dissolved therein, a number of additional advantages may accrue. The ecologically unattractive $H_2S$ need not be vented to the atmosphere, the recycled water does not require further treatment to remove $H_2S$ and the $H_2S$ may be of assistance in reducing coking of the catalyst by passivation of the heavy metals, i.e. by conversion thereof to the sulfide form which has a lesser tendency than the free metals to enhance coke and hydrogen production. In the reaction zone, the presence of $H_2O$ can dilute the carbo-metallic oil vapors, thus reducing their partial pressure and tending to increase the yield of the desired products. It has been reported that $H_2O$ is useful in combination with other materials in generating hydrogen during cracking; thus it may be able to act as a hydrogen donor for hydrogen deficient carbo-metallic oil feedstocks. The $H_2O$ may also serve certain purely mechanical functions such as: assisting in the atomizing or dispersion of the feed; competing with high molecular weight molecules for adsorption on the surface of the catalyst, thus interrupting coke formation; steam distillation of vaporizable product from unvaporized feed material; and disengagement of product from catalyst upon conclusion of the cracking reaction. It is particularly preferred to bring together $H_2O$, catalyst and carbo-metallic oil substantially simultaneously. For example, one may admix $H_2O$ and feedstock in an atomizing nozzle and immediately direct the resultant spray into contact with the catalyst at the downstream end of the reaction zone.

The addition of steam to the reaction zone is frequently mentioned in the literature of fluid catalytic cracking. Addition of liquid water to the feed is discussed relatively infrequently, compared to the introduction of steam directly into the reaction zone. However, in accordance with the present invention it is particularly preferred that liquid water be brought into intimate admixture with the carbo-metallic oil in a weight ratio of about 0.04 to about 0.25 at or prior to the time of introduction of the oil into the reaction zone, whereby the water (e.g., in the form of liquid water or in the form of steam produced by vaporization of liquid water in contact with the oil) enters the reaction zone as part of the flow of feedstock which enters such zone. Although not wishing to be bound by any theory, it is believed that the foregoing is advantageous in promoting dispersion of the feedstock. Also, the heat of vaporization of the water, which heat is absorbed from the catalyst, from the feedstock, or from both, causes the water to be a more efficient heat sink than steam alone. Preferably the weight ratio of liquid water to feed is about 0.04 to about 0.2 more preferably about 0.05 to about 0.15.

Of course, the liquid water may be introduced into the process in the above described manner or in other ways, and in either event the introduction of liquid water may be accompanied by the introduction of additional amounts of water as steam into the same or different portions of the reaction zone or into the catalyst and/or feedstock. For example, the amount of additional steam may be in a weight ratio relative to feed in the range of about 0.01 to about 0.25, with the weight ratio of total $H_2O$ (as steam and liquid water) to feedstock being about 0.3 or less. The charging weight ratio of liquid water relative to steam in such combined use of liquid water and steam may for example range from about 15 which is presently preferred, to about 0.2. Such ratio may be maintained at a predetermined level within such range or varied as necessary or desired to adjust or maintain heat balance.

Other materials may be added to the reaction zone to perform one or more of the above described functions. For example, the dehydrogenation-condensation activity of heavy metals may be inhibited by introducing hydrogen sulfide gas into the reaction zone. Hydrogen may be made available for hydrogen deficient carbo-metallic oil feedstocks by introducing into the reaction zone either a conventional hydrogen donor diluent such as a heavy naphtha or relatively low molecular weight carbon-hydrocarbon fragment contributors, including for example: light paraffins; low molecular weight alcohols and other compounds which permit or favor intermolecular hydrogen transfer; and compounds that chemically combine to generate hydrogen in the reaction zone such as by reaction of carbon monoxide with water, or with alcohols, or with olefins, or with other materials or mixtures of the foregoing.

All of the above mentioned additional materials (including water), alone or in conjunction with each other or in conjunction with other materials, such as nitrogen or other inert gases, light hydrocarbons, and others, may perform any of the above-described functions for which they are suitable, including without limitation, acting as diluents to reduce feed partial pressure and/or as heat sinks to absorb excess heat present in the catalyst as received from the regeneration step. The foregoing is a discussion of some of the functions which can be performed by materials other than catalyst and carbo-metallic oil feedstock introduced into the reaction zone, and it should be understood that other materials may be added or other functions performed without departing from the spirit of the invention.

The invention may be practiced in a wide variety of apparatus. However, the preferred apparatus includes means for rapidly vaporizing as much feed as possible and efficiently admixing feed and catalyst (although not necessarily in that order), for causing the resultant mixture to flow as a dilute suspension in a progressive flow mode, and for separating the catalyst from cracked products and any uncracked or only partially cracked feed at the end of a predetermined residence time or times, it being preferred that all or at least a substantial portion of the product should be abruptly separated from at least a portion of the catalyst.

For example, the apparatus may include, along its elongated reaction chamber, one or more points for introduction of carbo-metallic feed, one or more points for introduction of catalyst, one or more points for introduction of additional material, one or more points for withdrawal of products and one or more points for withdrawal of catalyst.

The means for introducing feed, catalyst and other material may range from open pipes to sophisticated jets or spray nozzles, it being preferred to use means capable of breaking up the liquid feed into fine droplets. Preferably, the catalyst, liquid water (when used) and fresh feed are brought together in an apparatus similar to that disclosed in U.S. patent application Ser. No. 969,601 of George D. Myers, et al., filed Dec. 14, 1978, now abandoned, the entire disclosure of which is hereby incorporated herein by reference. Accordingly to a particularly preferred embodiment based on a suggestion which is understood to have emanated from Mr. Stephen M. Kovach, the liquid water and carbo-metallic oil, prior to their introduction into the riser, are caused to pass through a propeller, apertured disc, or any appropriate high shear agitating means for forming a "homogenized mixture" containing finely divided droplets of oil and/or water with oil and/or water present as a continuous phase.

It is preferred that the reaction chamber, or at least the major portion thereof, be more nearly vertical than horizontal and have a length to diameter ratio of at least about 10, more preferably about 20 or 25 or more. Use of a vertical riser type reactor is preferred. If tubular, the reactor can be of uniform diameter throughout or may be provided with a continuous or step-wise increase in diameter along the reaction path to maintain or vary the velocity along the flow path.

In general, the charging means (for catalyst and feed) and the reactor configuration are such as to provide a relatively high velocity of flow and dilute suspension of catalyst. For example, the vapor or catalyst velocity in the riser will be usually at least about 25 and more typically at least about 35 feet per second. This velocity may range up to about 55 or about 75 feet or about 100 feet per second or higher. The vapor velocity at the top of the reactor may be higher than that at the bottom and may for example be about 80 feet per second at the top and about 40 feet per second at the bottom. The velocity capabiities of the reactor will in general be sufficient to prevent substantial build-up of catalyst bed in the bottom or other portions of the riser, whereby the catalyst loading in the riser can be maintained below about 4 or 5 pounds, as for example about 0.5 pounds, and below about 2 pounds, as for example 0.8 pounds, per cubic foot, respectively, at the upstream (e.g., bottom) and downstream (e.g., top) ends of the riser.

The progressive flow mode involves, for example, flowing of catalyst, feed and products as a stream in a positively controlled and maintained direction established by the elongated nature of the reaction zone. This is not to suggest however that there must be strictly linear flow. As is well known, turbulent flow and "slippage" of catalyst may occur to some extent especially in certain ranges of vapor velocity and some catalyst loadings, although it has been reported advisable to employ sufficiently low catalyst loadings to restrict slippage and back-mixing.

Most preferably the reactor is one which abruptly separates a substantial portion or all of the vaporized cracked products from the catalyst at one or more points along the riser, and preferably separates substantially all of the vaporized cracked products from the catalyst at the downstream end of the riser. A preferred type of reactor embodies ballistic separation of the catalyst and products; that is, catalyst is projected in a direction established by the riser tube, and is caused to continue its motion in the general direction so established, while the products, having lesser momentum, are caused to make an abrupt change of direction, resulting in an abrupt, substantially instantaneous separation of product from catalyst. In a preferred embodiment referred to as a vented riser, the riser tube is provided with a substantially unobstructed discharge opening at its downstream end for discharge of catalyst. An exit port near the tube outlet adjacent the downstream end receives the products. The discharge opening communicates with a catalyst flow path which extends to the usual stripper and regenerator, while the exit port communicates with a product flow path which is substantially or entirely separated from the catalyst flow path and leads to separation means for separating the products from the relatively small portion of catalyst, if any, which manages to gain entry to the product exit port. The mode of catalyst/product separation presently deemed best for practicing the present invention is disclosed in FIG. 2, discussed below. with the riser tube. By means of a product vapor line communicating with the interior of the cup but not the interior of the riser tube, having its inlet positioned within the cup interior in a direction upstream of the riser tube outlet, product vapors emanating from the riser tube and entering the cup by diversion of direction are transported away from the cup to auxiliary catalyst and product separation equipment downstream of the cup. Such an arrangement can produce a high degree of completion of the separation of catalyst from product vapors at the vented riser tube outlet, so that the required amount of auxiliary catalyst separation equipment such as cyclones is greatly reduced, with consequent large savings in capital investment and operating cost.

Preferred conditions for operation of the process are described below. Among these are feed, catalyst and reaction temperatures, reaction and feed pressures, residence time and levels of conversion, coke production and coke laydown on catalyst.

In conventional FCC operations with VGO, the feedstock is customarily preheated, often to temperatures significantly higher than are required to make the feed sufficiently fluid for pumping and for introduction into the reactor. For example, preheat temperatures as high as about 700° or 800° F. have been reported. But in our process as presently practiced it is preferred to restrict preheating of the feed, so that the feed is capable of absorbing a larger amount of heat from the catalyst while the catalyst raises the feed to conversion temperature, at the same time minimizing utilization of external fuels to heat the feedstock. Thus, where the nature of the feedstock permits, it may be fed at ambient temperature. Heavier stocks may be fed at preheat temperatures of up to about 600° F., typically about 200° F. to about 500° F., but higher preheat temperatures are not necessarily excluded.

The catalyst fed to the reactor may vary widely in temperature, for example from about 1100° to about 1600° F., more preferably about 1200° to about 1500° F. and most preferably about 1300° to about 1400° F., with about 1325° to about 1375° F. being considered optimum at present.

As indicated previously, the conversion of the carbometallic oil to lower molecular weight products may be conducted at a temperature of about 900° to about 1400° F., measured at the reaction chamber outlet. The reaction temperature as measured at said outlet is more preferably maintained in the range of about 965° to about 1300° F., still more preferably about 975° to about 1200° F., and most preferably about 980° to about 1150° F. Depending upon the temperature selected and the properties of the feed, all of the feed may or may not vaporize in the riser.

Although the pressure in the reactor may, as indicated above, range from about 10 to about 50 psia, preferred and more preferred pressure ranges are about 15 to about 35 and about 20 to about 35. In general, the partial (or total) pressure of the feed may be in the range of about 3 to about 30, more preferably about 7 to about 25 and most preferably about 10 to about 17 psia. The feed partial pressure may be controlled or suppressed by the introduction of gaseous (including vaporous) materials into the reactor, such as for instance the steam, water and other additional materials described above. The process has for example been operated with the ratio of feed partial pressure relative to total pressure in the riser in the range of about 0.2 to about 0.8, more typically about 0.3 to about 0.7 and still more typically about 0.4 to about 0.6, with the ratio of added gaseous material (which may include recycled gases and/or steam resulting from introduction of $H_2O$ to the riser in the form of steam and/or liquid water) relative to total pressure in the riser correspondingly ranging from about 0.8 to about 0.2, more typically about 0.7 to about 0.3 and still more typically about 0.6 to about 0.4. In the illustrative operations just described, the ratio of the partial pressure of the added gaseous material relative to the partial pressure of the feed has been in the range of about 0.25 to about 4.0, more typically about 0.4 to about 2.3 and still more typically about 0.7 to about 1.7.

Although the residence time of feed and product vapors in the riser may be in the range of about 0.5 to about 10 seconds, as described above, preferred and more preferred values are about 0.5 to about 6 and about 1 to about 4 seconds, with about 1.5 to about 3.0 seconds currently being considered about optimum. For example, the process has been operated with a riser vapor residence time of about 2.5 seconds or less by introduction of copious amounts of gaseous materials into the riser, such amounts being sufficient to provide for example a partial pressure ratio of added gaseous materials relative to hydrocarbon feed of about 0.8 or more. By way of further illustration, the process has been operated with said residence time being about 2 seconds or less, with the aforesaid ratio being in the range of about 1 to about 2. The combination of low feed partial pressure, very low residence time and ballistic separation of products from catalyst are considered especially beneficial for the conversion of carbo-metallic oils. Additional benefits may be obtained in the foregoing combination when there is a substantial partial pressure of added gaseous material, especially $H_2O$ as described above.

Depending upon whether there is slippage between the catalyst and hydrocarbon vapors in the riser, the catalyst riser residence time may or may not be the same as that of the vapors. Thus, the ratio of average catalyst reactor residence time versus vapor reactor residence time, i.e., slippage, may be in the range of about 1 to about 5, more preferably about 1 to about 4 and most preferably about 1 to about 3, with about 1 to about 2 currently being considered optimum.

In practice, there will usually be a small amount of slippage, e.g., at least about 1.05 or 1.2. In an operating unit there may for example be a slippage of about 1.1 at the bottom of the riser and about 1.05 at the top.

In certain types of known FCC units, there is a riser which discharges catalyst and product vapors together into an enlarged chamber, usually considered to be part of the reactor, in which the catalyst is disengaged from product and collected. Continued contact of catalyst, uncracked feed (if any) and cracked products in such enlarged chamber results in an overall catalyst feed contact time appreciably exceeding the riser tube residence times of the vapors and catalysts. When practicing the process of the present invention with ballistic separation of cataÿst and vapors at the downstream (e.g., upper) extremity of the riser, such as is taught in the above mentioned Myers, et al., patents, the riser residence time and the catalyst contact time are substantially the same for a major portion of the feed and product vapors. It is considered advantageous if the vapor riser residence time and vapor catalyst contact time are substantially the same for at least about 80%, more preferably at least about 90% and most preferably at least about 95% by volume of the total feed and product vapors passing through the riser. By denying such vapors continued contact with catalyst in a catalyst disengagement and collection chamber one may avoid a tendency toward re-cracking and diminished selectivity.

In general, the combination of catalyst to oil ratio, temperatures, pressures and residence times should be such as to effect a substantial conversion of the carbo-metallic oil feedstock. It is an advantage of the process that very high levels of conversion can be attained in a single pass; for example the conversion may be in excess of 50% and may range to about 90% or higher. Preferably, the aforementioned conditions are maintained at levels sufficient to maintain conversion levels in the range of about 60 to about 90% and more preferably about 70 to about 85%. The foregoing conversion levels are calculated by subtracting from 100% the percentage obtained by dividing the liquid volume of fresh feed into 100 times the volume of liquid product boiling at and above 430° F. (tbp, standard atmospheric pressure).

These substantial levels of conversion may and usually do result in relatively large yields of coke, such as for example about 4 to about 14% by weight based on fresh feed, more commonly about 6 to about 13% and most frequently about 10 to about 13%. The coke yield can more or less quantitatively deposit upon the catalyst. At contemplated catalyst to oil ratios, the resultant coke laydown may be in excess of about 0.3, more commonly in excess of about 0.5 and very frequently in excess of about 1% of coke by weight, based on the weight of moisture free regenerated catalyst. Such coke laydown may range as high as about 2%, or about 3%, or even higher.

In common with conventional FCC operations on VGO, the present process includes stripping of spent catalyst after disengagement of the catalyst from product vapors. Persons skilled in the art are acquainted with appropriate stripping agents and conditions for stripping spent catalyst, but in some cases the present process may require somewhat more severe conditions than are commonly employed. This may result, for example, from the use of a carbo-metallic oil having constituents which do not volatilize under the conditions prevailing in the reactor, which constituents deposit themselves at least in part on the catalyst. Such absorbed, unvaporized material can be troublesome from at least two standpoints. First, if the gases (including vapors) used to strip the catalyst can gain admission to a catalyst disengagement or collection chamber connected to the downstream end of the riser, and if there is an accumulation of catalyst in such chamber, vaporization of these unvaporized hydrocarbons in the stripper can be followed by absorption on the bed of catalyst in the chamber. More particularly, as the catalyst in the stripper is stripped of adsorbed feed material, the resultant feed material vapors pass through the bed of catalyst accumulated in the catalyst collection and/or disengagement chamber and may deposit coke and/or condensed material on the catalyst in said bed. As the catalyst bearing such deposits moves from the bed and into the stripper and from thence to the regenerator, the condensed products can create a demand for more stripping capacity, while the coke can tend to increase regeneration temperatures and/or demand greater regeneration capacity. For the foregoing reasons, it is preferred to prevent or restrict contact between stripping vapors and catalyst accumulations in the catalyst disengagement or collection chamber. This may be done for example by preventing such accumulations from forming, e.g., with the exception of a quantity of catalyst which essentially drops out of circulation and may remain at the bottom of the disengagement and/or collection chamber, the catalyst that is in circulation may be removed from said chamber promptly upon settling to the bottom of the chamber. Also, to minimize regeneration temperatures and demand for regeneration capacity, it may be desirable to employ conditions of time, temperature and atmosphere in the stripper which are sufficient to reduce potentially volatile hydrocarbon material borne by the stripped catalyst to about 10% or less by weight of the total carbon loading on the catalyst. Such stripping may for example include reheating of the catalyst, extensive stripping with steam, the use of gases having a temperature considered higher than normal for FCC/VGO operations, such as for instance flue gas from the regenerator, as well as other refinery stream gases such as hydrotreater off-gas ($H_2S$ containing), hydrogen and others. For example, the stripper may be operated at a temperature of about 350° F. using steam at a pressure of about 150 psig and a weight ratio of steam to catalyst of about 0.002 to about 0.003. On the other hand, the stripper may be operated at a temperature of about 1025° F. or higher.

Substantial conversion of carbo-metallic oils to lighter products in accordance with the invention tends to produce sufficiently large coke yields and coke laydown on catalyst to require some care in catalyst regeneration. In order to maintain adequate activity in zeolite and nonzeolite catalysts, it is desirable to regenerate the catalyst under conditions of time, temperature and atmosphere sufficient to reduce the percent by weight of carbon remaining on the catalyst to about 0.25% or less, whether the catalyst bears a large heavy metals accumulation or not. Preferably this weight percentage is about 0.1% or less and more preferably about 0.05% or less, especially with zeolite catalysts. The amounts of coke which must therefore be burned off of the catalysts when processing carbo-metallic oils are usually substantially greater than would be the case when cracking VGO. The term coke when used to describe the present invention, should be understood to include any residual unvaporized feed or cracking product, if any such material is present on the catalyst after stripping.

Regeneration of catalyst, burning away of coke deposited on the catalyst during the conversion of the feed, may be performed at any suitable temperature in the range of about 1100° to about 1600° F., measured at the regenerator catalyst outlet. This temperature is preferably in the range of about 1200° to about 1500° F., more preferably about 1275° to about 1425° F. and optimally about 1325° F. to about 1375° F. The process has been operated, for example, with a fluidized regenerator with the temperature of the catalyst dense phase in the range of about 1300° to about 1400° F.

Regeneration is preferably conducted while maintaining the catalyst in one or more fluidized beds in one or more fluidization chambers. Such fluidized bed operations are characterized, for instance, by one or more fluidized dense beds of ebulliating particles having a bed density of, for example, about 25 to about 50 pounds per cubic foot. Fluidization is maintained by passing gases, including combustion supporting gases, through the bed at a sufficient velocity to maintain the particles in a fluidized state but at a velocity which is sufficiently small to prevent substantial entrainment of particles in the gases. For example, the lineal velocity of the fluidizing gases may be in the range of about 0.2 to about 4 feet per second and preferably about 0.2 to about 3 feet per second. The average total residence time of the particles in the one or more beds is substantial, ranging for example from about 5 to about 30, more preferably about 5 to about 20 and still more preferably about 5 to about 10 minutes. From the foregoing, it may be readily seen that the fluidized bed regeneration of the present invention is readily distinguishable from the short-contact, low-density entrainment type regeneration which has been practiced in some FCC operations.

When regenerating catalyst to very low levels of carbon on regenerated catalyst, e.g., about 0.1% or less or about 0.05% or less, based on the weight of regenerated catalyst, it is acceptable to burn off at least about the last 10% or at least about the last 5% by weight of coke (based on the total weight of coke on the catalyst immediately prior to regeneration) in contact with combustion producing gases containing excess oxygen. In this connection it is contemplated that some selected portion of the coke, ranging from all of the coke down to about the last 5 or 10% by weight, can be burned with excess oxygen. By excess oxygen is meant an amount in excess of the stoichiometric requirement for burning all of the hydrogen to water, all of the carbon to carbon dioxide and all of the other combustible components, if any, which are present in the above-mentioned selected portion of the coke immediately prior to regeneration, to their highest stable state of oxidation under the regenerator conditions. The gaseous products of combustion conducted in the presence of excess oxygen will normally include an appreciable amount of free oxygen. Such free oxygen, unless removed from the by-product gases or converted to some other form by a means or process other than regeneration, will normally manifest itself as free oxygen in the flue gas from the regenerator unit. In order to provide sufficient driving force to complete the combustion of the coke with excess oxygen, the amount of free oxygen will normally be not merely appreciable but substantial, i.e., there will be a concentration of at least about 2 mole percent of free oxygen in the total regeneration flue gas recovered from the entire, completed regeneration operation. While such technique is effective in attaining the desired low levels of carbon on regenerated catalyst, it has its limitations and difficulties as will become apparent from the discussion below. Heat released by combustion of coke in the regenerator is absorbed by the catalyst and can be readily retained thereby until the regenerated catalyst is brought into contact with fresh feed. When processing carbo-metallic oils to the relatively high levels of conversion involved in the present invention, the amount of regenerator heat which is transmitted to fresh feed by way of recycling regenerated catalyst can substantially exceed the level of heat input which is appropriate in the riser for heating and vaporizing the feed and other materials, for supplying the endothermic heat of reaction for cracking, for making up the heat losses of the unit and so forth. Thus, in accordance with the invention, the amount of regenerator heat transmitted to fresh feed may be controlled, or restricted where necessary, within certain approximate ranges. The amount of heat so transmitted may for example be in the range of about 500 to about 1200, more particularly about 600 to about 900, and more particularly about 650 to about 850 BTUs per pound of fresh feed. The aforesaid ranges refer to the combined heat, in BTUs per pound of fresh feed, which is transmitted by the catalyst to the feed and reaction products (between the contacting of feed with the catalyst and the separation of product from catalyst) for supplying the heat of reaction (e.g., for cracking) and the difference in enthalpy between the products and the fresh feed. Not included in the foregoing are the heat made available in the reactor by the adsorption of coke on the catalyst, nor the heat consumed by heating, vaporizing or reacting recycle streams and such added materials as water, steam naphtha and other hydrogen donors, flue gases and inert gases, or by radiation and other losses.

One or a combination of techniques may be utilized in this invention for controlling or restricting the amount of regeneration heat transmitted via catalyst to fresh feed. For example, one may add a combustion modifier to the cracking catalyst in order to reduce the temperature of combustion of coke to carbon dioxide and/or carbon monoxide in the regenerator. Moreover, one may remove heat from the catalyst through heat exchange means, including for example, heat exchangers (e.g., steam coils) built into the regenerator itself, whereby one may extract heat from the catalyst during regeneration. Heat exchangers can be built into catalyst transfer lines, such as for instance the catalyst return line from the regenerator to the reactor, whereby heat may be removed from the catalyst after it is regenerated. The amount of heat imparted to the catalyst in the regenerator may be restricted by reducing the amount of insulation on the regenerator to permit some heat loss to the surrounding atmosphere, especially if feeds of exceedingly high coking potential are planned for processing; in general, such loss of heat to the atmosphere is considered economically less desirable than certain of the other alternatives set forth herein. One may also inject cooling fluids into portions of the regenerator other than those occupied by the dense bed, for example water and/or steam, whereby the amount of inert gas available in the regenerator for heat absorption and removal is increased.

Another suitable and preferred technique for controlling or restricting the heat transmitted to fresh feed via recycled regenerated catalyst involves maintaining a specified ratio between the carbon dioxide and carbon monoxide formed in the regenerator while such gases are in heat exchange contact or relationship with catalyst undergoing regeneration. In general, all or a major portion by weight of the coke present on the catalyst immediately prior to regeneration is removed in at least one combustion zone in which the aforesaid ratio is controlled as described below. More particularly, at least the major portion more preferably at least about 65% and more preferably at least about 80% by weight of the coke on the catalyst is removed in a combustion zone in which the molar ratio of $CO_2$ to CO is maintained at a level substantially below 5, e.g., about 4 or less. Looking at the $CO_2$/CO relationship from the inverse standpoint, it is preferred that the $CO/CO_2$ molar ratio should be at least about 0.25 and preferably at least about 0.3 and still more preferably about 1 or more or even 1.5 or more.

While persons skilled in the art are aware of techniques for inhibiting the burning of CO to $CO_2$, it has been suggested that the mole ratio of $CO:CO_2$ should be kept less than 0.2 when regenerating catalyst with large heavy metal accumulations resulting from the processing of carbo-metallic oils, in this connection see for example U.S. Pat. No. 4,162,213 to Zrinscak, Sr., et al. In this invention, however, CO production is increased while catalyst is regenerated to about 0.1% carbon or less, and preferably to about 0.05% carbon or less. Moreover, according to a preferred method of carrying out the invention the sub-process of regeneration, as a whole, may be carried out to the above-mentioned low levels of carbon on regenerated catalyst with a deficiency of oxygen; more specifically, the total oxygen supplied to the one or more stages of regeneration can be and preferably is less than the stoichiometric amount which would be required to burn all hydrogen in the coke to $H_2O$ and to burn all carbon in the coke to $CO_2$. If the coke includes other combustibles, the aforementioned stoichiometric amount can be adjusted to include the amount of oxygen required to burn them.

Still another particularly preferred technique for controlling or restricting the regeneration heat imparted to fresh feed via recycled catalyst involves the diversion of a portion of the heat borne by recycled catalyst to added materials introduced into the reactor, such as the water, steam, naphtha, other hydrogen donors, flue gases, inert gases, and other gaseous or vaporizable materials which may be introduced into the reactor. The larger the amount of coke which must be burned from a given weight of catalyst, the greater the potential for exposing the catalyst to excessive temperatures. Many otherwise desirable and useful cracking catalysts are particularly susceptible to deactivation at high temperatures, and among these are quite a few of the costly molecular sieve or zeolite types of catalyst. The crystal structures of zeolites and the pore structures of the catalyst carriers generally are somewhat susceptible to thermal and/or hydrothermal degradation. The use of such catalysts in catalytic conversion processes for carbo-metallic feeds creates a need for regeneration techniques which will not destroy the catalyst by exposure to highly severe temperatures and steaming. Such need can be met by a multi-stage regeneration process which includes conveying spent catalyst into a first regeneration zone and introducing oxidizing gas thereto. The amount of oxidizing gas that enters said first zone and the concentration of oxygen or oxygen bearing gas therein are sufficient for only partially effecting the desired conversion of coke on the catalyst to carbon oxide gases. The partially regenerated catalyst is then removed from the first regeneration zone and is conveyed to a second regeneration zone. Oxidizing gas is introduced into the second regeneration zone to provide a higher concentration of oxygen or oxygen-containing gas than in the first zone, to complete the removal of carbon to the desired level. The regenerated catalyst may then be removed from the second zone and recycled to the reactor for contact with fresh feed. An example of such multi-stage regeneration process is described in U.S. patent application Ser. No. 969,602 of George D. Myers, et al., filed Dec. 14, 1978, now abandoned, the entire disclosure of which is hereby incorporated herein by reference. Another example may be found in U.S. Pat. No. 2,938,739.

Multi-stage regeneration offers the possibility of combining oxygen deficient regeneration with the control of the $CO:CO_2$ molar ratio. Thus, about 50% or more, more preferably about 65% to about 95%, and more preferably about 80% to about 95% by weight of the coke on the catalyst immediately prior to regeneration may be removed in one or more stages of regeneration in which the molar ratio of $CO:CO_2$ is controlled in the manner described above. In combination with the foregoing, the last 5% or more, or 10% or more by weight of the coke originally present, up to the entire amount of coke remaining after the preceding stage or stages, can be removed in a subsequent stage of regeneration in which more oxygen is present. Such process is susceptible of operation in such a manner that the total flue gas recovered from the entire, completed regeneration operation contains little or no excess oxygen, i.e., on the order of about 0.2 mole percent or less, or as low as about 0.1 mole percent or less, which is substantially less than the 2 mole percent which has been suggested elsewhere. Thus, multi-stage regeneration is particularly beneficial in that it provides another convenient technique for restricting regeneration heat transmitted to fresh feed via regenerated catalyst and/or reducing the potential for thermal deactivation, while simultaneously affording an opportunity to reduce the carbon level on regenerated catalyst to those very low percentages (e.g., about 0.1% or less) which particularly enhance catalyst activity. For example, a two-stage regeneration process may be carried out with the first stage burning about 80% of the coke at a bed temperature of about 1300° F. to produce CO and $CO_2$ in a molar ratio of $CO/CO_2$ of about 1 and the second stage burning about 20% of the coke at a bed temperature of about 1350° F. to produce substantially all $CO_2$ mixed with free oxygen. Use of the gases from the second stage as combustion supporting gases for the first stage, along with additional air introduced into the first stage bed, results in an overall CO to $CO_2$ ratio of about 0.6, with a catalyst residence time of about 5 to 15 minutes total in the two zones. Moreover, where the regeneration conditions, e.g., temperature or atmosphere, are substantially less severe in the second zone than in the first zone (e.g., by at least about 10 and preferably at least about 20° F.), that part of the regeneration sequence which involves the most severe conditions is performed while there is still an appreciable amount of coke on the catalyst. Such operation may provide some protection of the catalyst from the more severe conditions. A particularly preferred embodiment of the invention is two-stage fluidized regeneration at a maximum temperature of about 1500° F. with a reduced temperature of at least about 10° or 20° F. in the dense phase of the second stage as compared to the dense phase of the first stage, and with reduction of carbon on catalyst to about 0.05% or less or even about 0.025% or less by weight in the second zone. In fact, catalyst can readily be regenerated to carbon levels as low as 0.01% by this technique, even though the carbon on catalyst prior to regeneration is as much as 1%.

In most circumstances, it will be important to insure that no absorbed oxygen containing gases are carried into the riser by recycled catalyst. Thus, whenever such action is considered necessary, the catalyst discharged from the regenerator may be stripped with appropriate stripping gases to remove oxygen containing gases. Such stripping may for instance be conducted at relatively high temperatures, for example about 1350° to about 1370° F., using steam, nitrogen or other inert gas as the stripping gas(es). The use of nitrogen and other inert gases is beneficial from the standpoint of avoiding a tendency toward hydrothermal catalyst deactivation which may result from the use of steam.

The following comments and discussion relating to metals management, carbon management and heat management may be of assistance in obtaining best results when operating the invention. Since these remarks are for the most part directed to what is considered the best mode of operation, it should be apparent that the invention is not limited to the particular modes of operation discussed below. Moreover, since certain of these comments are necessarily based on theoretical considerations, there is no intention to be bound by any such theory, whether expressed herein or implicit in the operating suggestions set forth hereinafter.

Although discussed separately below, it is readily apparent that metals management, carbon management and heat management are interrelated and interdependent subjects both in theory and practice. While coke yield and coke laydown on catalyst are primarily the result of the relatively large quantities of coke precursors found in carbo-metallic oils, the production of coke is exacerbated by high metals accumulations, which can also significantly affect catalyst performance. Moreover, the degree of success experienced in metal management and carbon management will have a direct influence on the extent to which heat management is necessary. Moreover, some of the steps taken in support of metals management have proved very helpful in respect to carbon and heat management.

As noted previously the presence of a large heavy metals accumulation on the catalyst tends to aggravate the problem of dehydrogenation and aromatic condensation, resulting in increased production of gases and coke for a feedstock of a given Ramsbottom carbon value. The introduction of substantial quantities of $H_2O$ into the reactor, either in the form of steam or liquid water, appears highly beneficial from the standpoint of keeping the heavy metals in a less harmful form, i.e., the oxide rather than metallic form. This is of assistance in maintaining the desired selectivity.

Also, a unit design in which system components and residence times are selected to reduce the ratio of catalyst reactor residence time relative to catalyst regenerator residence time will tend to reduce the ratio of the times during which the catalyst is respectively under reduction conditions and oxidation conditions. This too can assist in maintaining desired levels of selectivity.

Whether the metals content of the catalyst is being managed successfully may be observed by monitoring the total hydrogen plus methane produced in the reactor and/or the ratio of hydrogen to methane thus produced. In general, it is considered that the hydrogen to methane mole ratio should be less than about 1 and preferably about 0.6 or less, with about 0.4 or less being considered about optimum. In actual practice the hydrogen to methane ratio may range from about 0.5 to about 1.5 and average about 0.8 to about 1.

Careful carbon management can improve both selectivity (the ability to maximize production of valuable products), and heat productivity. In general, the techniques of metals control described above are also of assistance in carbon management. The usefulness of water addition in respect to carbon management has already been spelled out in considerable detail in that part of the specification which relates to added materials for introduction into the reaction zone. In general, those techniques which improve dispersion of the feed in the reaction zone should also prove helpful, these include for instance the use of fogging or misting devices to assist in dispersing the feed.

Catalyst to oil ratio is also a factor in heat management. In common with prior FCC practice on VGO, the reactor temperature may be controlled in the practice of the present invention by respectively increasing or decreasing the flow of hot regenerated catalyst to the reactor in response to decreases and increases in reactor temperature, typically the outlet temperature in the case of a riser type reactor. Where the automatic controller for catalyst introduction is set to maintain an excessive catalyst to oil ratio, one can expect unnecessarily large rates of carbon production and heat release, relative to the weight of fresh feed charged to the reaction zone.

Relatively high reactor temperatures are also beneficial from the standpoint of carbon management. Such higher temperatures foster more complete vaporization of feed and disengagement of product from catalyst.

Carbon management can also be facilitated by suitable restriction of the total pressure in the reactor and the partial pressure of the feed. In general, at a given level of conversion, relatively small decreases in the aforementioned pressures can substantially reduce coke production. This may be due to the fact that restricting total pressure tends to enhance vaporization of high boiling components of the feed, encourage cracking and facilitate disengagement of both unconverted feed and higher boiling cracked products from the catalyst. It may be of assistance in this regard to restrict the pressure drop of equipment downstream of and in communication with the reactor. But if it is desired or necessary to operate the system at higher total pressure, such as for instance because of operating limitations (e.g., pressure drop in downstream equipment) the above described benefits may be obtained by restricting the feed partial pressure. Suitable ranges for total reactor pressure and feed partial pressure have been set forth above, and in general it is desirable to attempt to minimize the pressure within these ranges.

The abrupt separation of catalyst from product vapors and unconverted feed (if any) is also of great assistance. For this reason ballistic separation equipment is the preferred type of apparatus for conducting this process. For similar reasons, it is beneficial to reduce insofar as possible the elapsed time between separation of catalyst from product vapors and the commencement of stripping. The cup-type vented riser and prompt stripping tend to reduce the opportunity for coking of unconverted feed and higher boiling cracked products adsorbed on the catalyst.

A particularly desirable mode of operation from the standpoint of carbon management is to operate the process in the vented riser using a hydrogen donor if necessary, while maintaining the feed partial pressure and total reactor pressure as low as possible, and incorporating relatively large amounts of water, steam and if desired, other diluents, which provide the numerous benefits discussed in greater detail above. Moreover, when liquid water, steam, hydrogen donors, hydrogen and other gaseous or vaporizable materials are fed to the reaction zone, the feeding of these materials provides an opportunity for exercising additional control over catalyst to oil ratio. Thus, for example, the practice of increasing or decreasing the catalyst to oil ratio for a given amount of decrease or increase in reactor temperature may be reduced or eliminated by substituting either appropriate reduction or increase in the charging ratios of the water, steam and other gaseous or vaporizable material, or an appropriate reduction or increase in the ratio of water to steam and/or other gaseous materials introduced into the reaction zone.

Heat management includes measures taken to control the amount of heat released in various parts of the process and/or for dealing successfully with such heat as may be released. Unlike conventional FCC practice using VGO, wherein it is usually a problem to generate sufficient heat during regeneration to heat balance the reactor, the processing of carbometallic oils generally produces so much heat as to require careful management thereof.

Heat management can be facilitated by various techniques associated with the materials introduced into the reactor. Thus, heat absorption by feed can be maximized by minimum preheating of feed, it being necessary only that the feed temperature be high enough so that it is sufficiently fluid for successful pumping and dispersion in the reactor. When the catalyst is maintained in a highly active state with the suppression of coking (metals control), so as to achieve higher conversion, the resultant higher conversion and greater selectivity can increase the heat absorption of the reaction. In general, higher reactor temperatures promote catalyst conversion activity in the face of more refractory and higher boiling constituents with high coking potentials. While the rate of catalyst deactivation may thus be increased, the higher temperature of operation tends to offset this loss in activity. Higher temperatures in the reactor also contribute to enhancement of octane number, thus offsetting the octane depressant effect of high carbon laydown. Other techniques for absorbing heat have also been discussed above in connection with the introduction of water, steam, and other gaseous or vaporizable materials into the reactor.

The invention may also be applied to the RCC conversion of crude oils and crude oil fractions as disclosed in the U.S. Pat. No. 4,384,948 of Dwight F. Barger, entitled "Single Unit RCC" and filed simultaneously herewith, the entire contents of which are hereby incorporated herein by reference.

As noted above, the invention can be practiced in the abovedescribed modes and in many others. An illustrative, nonlimiting preferred example is described by the accompanying schematic diagram of FIG. 1 and by the description of this figure which follows.

Referring in detail to FIG. 1, 650° F.+ carbo-metallic oil passes along a feed conduit 82 to a junction with a water line 84 having control valve 83. Through suitable metering and control means (not shown) liquid water and the 650° F.+ carbo-metallic oil may be supplied in predetermined proportions to pump 79. The latter discharges a mixture of water and converter feed through control valve 80, feed preheater heat exchanger 81 and a continuation of feed conduit 82 into a riser type reactor 91.

In the operation of riser type reactor 91, catalyst is delivered to the reactor through catalyst standpoint 86, the flow of catalyst being regulated by a control valve 87 and suitable automatic control equipment (not shown) with which persons skilled in the art of designing and operating riser type cracking units are familiar.

After cracking of the feed in riser 91 and separation of the products from catalyst in disengagement vessel 92, the catalyst departs disengagement vessel 92 through stripper 94. Spent catalyst passes from stripper 94 to regenerator 101 via spent catalyst transfer pipe 97 having a slide valve 98 for controlling flow.

Regenerator 101 is divided into upper chamber 102 and lower chamber 103 by a divider panel 104 intermediate the upper and lower ends of the regenerator vessel. The spent catalyst from transfer pipe 97 enters upper chamber 102 in which the catalyst is partially regenerated. A funnel-like collector 106 having a bias-cut upper edge receives partially regenerated catalyst from the upper surface of the dense phase of catalyst in upper chamber 102 and delivers it, via drop leg 107 having an outlet 110, beneath the upper surface of the dense phase of catalyst in lower chamber 103. Instead of internal catalyst drop leg 107, one may use an external drop leg, not shown in the drawing. Valve means in such external drop leg can control the residence time and flow rate in and between the upper and lower chambers. Make up catalyst and/or catalyst or regenerator additives may be added to the upper chamber 102 and/or the lower chamber 103 through addition lines (not shown).

Air is supplied to the regenerator through an air supply pipe 113. A portion of the air travels through a branch supply pipe 114 to bayonet 115 which extends upwardly into the interior of plenum 111 along its central axis. Catalyst in chamber 103 has access to the space within plenum 111 between its walls and bayonet 115. A smaller bayonet (not shown) in the aforementioned space fluffs the catalyst and urges it upwardly toward a horizontally arranged ring distributor (not shown) adjacent the open top of plenum 111 where it opens into chamber 103. The remainder of the air passing through air supply pipe 113 may be heated in air heater 117 (at least during start-up with VGO) and is then introduced into inlet 118 of the ring distributor, which may be provided with holes, nozzles or other apertures which produce an upward flow of gas to fluidize the partially regenerated catalyst in chamber 103.

The air in chamber 103 completes the regeneration of the partially regenerated catalyst received via drop leg 107. The amount of air supplied is sufficient so that the resultant combustion gases are still able to support combustion upon reaching the top of chamber 103 and entering chamber 102. Drop leg 107 extends through an enlarged aperture in panel 104, to which is secured a gas distributor 120 which is concentric with and surrounds a drop leg. Combustion supporting gases from chamber 103, which have been partially depleted, are introduced via gas distributor 120 into upper regenerator chamber 102 where they contact incoming coked catalyst from coked catalyst transfer pipe 97. Apertured probes 121 in gas distributor 120 assist in achieving a uniform distribution of the partially depleted combustion supporting gas into upper chamber 102. Supplemental air or cooling fluids may be introduced into upper chamber 102 through a supply pipe 122, which may also discharge through gas distributor 120.

Fully regenerated catalyst with less than about 0.25% carbon, preferably less than about 0.1% and more preferably less than about 0.05%, is discharged from lower regenerator chamber 103 through regenerated catalyst stripper 128, whose outlet feeds into catalyst standpipe 86. Thus, regenerated catalyst is returned to riser 91 for contact with additional fresh feed.

The division of the regenerator into upper and lower regeneration chambers 102 and 103 not only smooths out variations in catalyst regenerator residence time but is also uniquely of assistance in restricting the quantity of regeneration heat which is imparted to the fresh feed while yielding a regenerated catalyst with low levels of coke for return to the riser.

Because of the arrangement of the regenerator, coked catalyst from transfer line 97, with a relatively high loading of carbon, contacts in chamber 102 combustion supporting gases which have already been at least partially depleted of oxygen by the burning of carbon from partially regenerated catalyst in lower chamber 102. Because of this, it is possible to control both the combustion of carbon and the quantity of carbon dioxide produced in upper regeneration chamber 102. Although regenerating gas introduced through air supply pipe 113 and branch conduit 114 may contain relatively large quantities of oxygen, the partially regenerated catalyst which is contacted in lower chamber 103 has already had a major portion of its carbon removed. The high oxygen concentration and temperature in chamber 103 combine to rapidly remove the remaining carbon in the catalyst, thereby achieving a clean, regenerated catalyst with a minimum of heat release. Thus, here again, the combustion temperature and the ratio of $CO_2$ to CO in the lower chamber are readily controlled. The regeneration off gases are discharged from upper chamber 102 via gas pipe 123, regulator valve 124, catalyst fines trap 125 and outlet 126.

The vapor products from disengagement vessel 92 may be processed in any convenient manner such as by discharge through vapor line 131 to fractionator 132. Fractionator 132 includes a bottoms outlet 133, side outlet 134, flush oil stripper 135, and stripper bottom line 136 connected to pump 137 for discharging flush oil. Overhead product from stripper 135 returns to fractionator 132 via line 138.

The main overhead discharge line 139 of the fractionator is connected to an overhead receiver 142 having a bottoms line 143 feeding into pump 144 for discharging gasoline product. A portion of this product may be returned to the fractionator via recirculation line 145, the flow being controlled by valve 146. The receiver 142 also includes a water receiver 147 and a water discharge line 148. The gas outlet 150 of the overhead receiver discharges a stream which is mainly below $C_5$, but containing some $C_5$, $C_6$ and $C_7$ material. If desired, the $C_5$ and above material in the gas stream may be separated by compression, cooling and fractionation, and recycled to receiver 142.

The oxidizing gas, such as air, introduced into regeneration zone 103 through line 114 may be mixed with a cooling spray of water from a conduit 109. The mixture of oxidizing gas and atomized water flows through bayonet 115 and thus into the lower bed of catalyst particles.

The apertures in distributor 120 are large enough so that the upwardly flowing gas readily passes therethrough into zone 102. However, the perforations are sized so that the pressure difference between the upper and lower zones prevents catalyst particles from passing downwardly through the distributor. The bayonet 115 and distributor are similarly sized. Gases exiting the regenerator comprise combustion products, nitrogen, steam formed by combustion reactions and/or from vaporizing water added to the regenerator, and oxides of sulfur and other trace elements. These gases are separated from suspended catalyst particles by a cyclone separator (not shown) and then pass out of the regenerator through discharge conduit 123.

Figure 2:
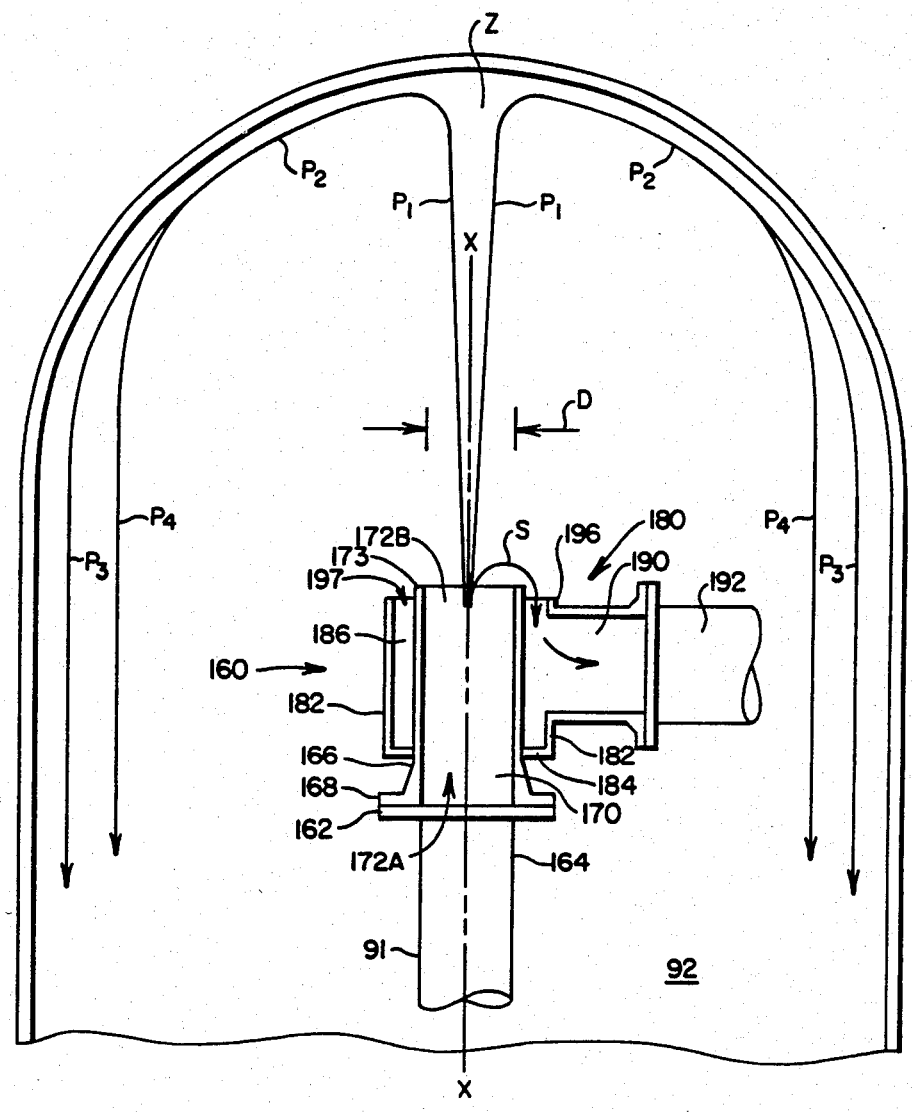
FIG. 2 is an enlarged portion of FIG. 1, partly in section, disclosing the interior of the disengagement chamber and catalyst/product vapor apparatus therein.

While this invention may be used with single stage regenerators, or with multiple stage regenerators which have basically concurrent instead of countercurrent flow between combustion gases and catalyst, it is especially useful in regenerators of the type shown in FIG. 2, which has countercurrent flow and is well-suited for producing combustion product gases having a low ratio of $CO_2$ to CO, which helps lower regeneration temperatures in the presence of high carbon levels.

Since zeolite in the catalyst may be damaged by excessive temperatures and/or excessive residence times at such temperatures, it is preferable to use a regenerator having two or more stages or zones. Division of the regenerator into upper and lower regeneration chambers as shown in FIG. 2 is of unique assistance in controlling regeneration so that low levels of coke on regenerated catalyst can be attained without subjecting the catalyst to excessive temperature. FIG. 2 shows in enlarged vertical cross-section the upper portion of disengagement chamber 92, the upper end 164 of riser 91 within chamber 92, and the details of the gas/solids separation equipment therein. More specifically, a separation apparatus for effecting separation of hydrocarbon conversion products from suspended solid catalyst particles is shown in cross-section and generally indicated by numeral 160.

The separation apparatus includes an outlet section. This may be any hollow member defining a passageway which either constitutes part of the elongated reaction chamber itself and includes its outlet end, or is an extension or branch of the reaction chamber which is in direct communication with the chamber for receiving a stream including catalyst particles suspended in products. In certain instances there will be no discernible line of demarcation between the outlet section and upstream portions of the reaction chamber, i.e. they can both be part of the same length of pipe. In other instances, as disclosed herein, the apparatus 160 includes a hollow outlet section 166 having an end flange 168 compatible in size with and secured, such as by bolting or welding (not shown), to a downstream end flange 162 of upper end 164 of tubular riser 91. Outlet section 166 may instead be an integral extension of tubular riser 91 or may be butt welded to upper end 164 to eliminate flanges 162 and 168.

As shown in the drawing, passageway 170 has a circular cross-section of substantially uniform cross-section throughout substantially its entire length, commencing with an inlet portion 172A and terminating with an outlet portion 172B, having a terminal lip 173. As will be explained hereinafter, the outlet portion 172B and lip 173 may be of the same, larger or smaller cross-sectional area as compared to the inlet portion 172A and/or the riser 91 internal cross-section. Moreover, it is not essential that the passageway 170, lip 173, and inlet and outlet portions 172A and 172B be of circular cross-sections. Other regular and irregular shapes are contemplated and acceptable. Risers have been successfully used which include one or more bends intermediate their upstream and downstream ends, and the invention is useable with risers of this type. A sharp bend in the riser can substantially decelerate the catalyst particles. Thus, if there is a significant bend a short distance upstream of the outlet section outlet portion 172B, and if the resultant reduction in catalyst velocity severely impairs the separation efficiency of the device, it may be desirable or necessary to increase the radius of the bend and/or move it further upstream relative to the outlet portion 172B. This will permit the catalyst paticles to reaccelerate before reaching the outlet portion, assuming the product vapors in the vapor/solids stream continue, for a substantial distance downstream of the bend, to move at a faster velocity than did the catalyst particles upon leaving the bend. In the present embodiment however, the outlet section 166 and its discharge flow passageway 170 have a longitudinal axis X-X which is coincident with the longitudinal axis of the flow passageway which exists throughout the length of straight riser 91, only the upstream end 164 of which is shown in FIG. 2. It is also preferred that inlet portion 172A and outlet portion 172B be in substantial axial alignment with one another to provide a continuous discharge flow passageway for hydrocarbon conversion products and solid catalyst particles flowing from tubular riser 164.

For best results, it is presently recommended that the outlet section 170 be positioned with its longitudinal axis X-X vertical or near vertical, e.g. if desired the axis may be canted from the vertical by an angle of up to about 30°, more preferably up to about 20°, and still more preferably up to about 10°. The use of larger angles is contemplated, but losses of efficiency are experienced as the above-mentioned angle is increased. However, inverted operation in vertical or near vertical position, i.e. with the outlet portion 172B opening downward, is also contemplated, and may in some instances derive an advantage from the effect of gravity.

Separation apparatus 160 further includes a shroud assembly 180 which at least partially encloses outlet section 166. In a preferred embodiment, as viewed in cross-section perpendicular to outlet section axis X-X, shroud assembly 180 is an annulus surrounding the outline of outlet section 166. However, it is considered within the scope of the present invention to employ a shroud assembly extending adjacent to any substantial portion (including all) of the above-mentioned outline of outlet section 166. Shroud assembly 180 includes an outer wall portion 182 extending substantially parallel to the longitudinal axis X-X through outlet section 166. Shroud assembly 180 also includes a connecting wall portion 184 extending inwardly from the outer wall portion 182 toward the outer wall of outlet section 166. It is preferred but not required that there be at least a partial closure of the upstream (compared to the direction of flow in riser 91) end of shroud 180. However, a gap, opening or openings in connecting wall portion 184 can prove useful from the standpoint of accommodating differential expansion and contraction of the shroud and outlet section and may also provide a means of aspirating spent stripping steam where the disengagement chamber includes a stripper located upstream of outlet section 166. For example, such a stripper can surround riser 91. Outer wall portion 182 and connecting wall portion 184 (when present) define a substantially cup-shaped shroud, which is a preferred embodiment.

Outer wall portion 182, with or without connecting wall 184, cooperates with outlet section 166 to define a collection flow passageway 186 therebetween. In a preferred embodiment of the present invention, collection flow passageway 186 exhibits an annular cross-section extending the entire length of outer wall portion 182. However, other cross-sectional shapes are contemplated and acceptable.

At least one outlet port 190 is formed through a portion of shroud 180 and preferably through an outer wall portion 182. However, the outlet port may be provided in connecting wall 184. Outlet port 190 serves to provide a fluid passageway between collection flow passageway 186 and a hollow outlet conduit 192. Outlet conduit 192 may extend from shroud 180 to a second stage separation device such as a conventional cyclone assembly not shown.

As noted in FIG. 2, separation apparatus 160 as well as the attached downstream end portion of riser 164 are located within a disengagement chamber 92. The second stage separation or cleaning device of the type referred to hereabove may or may not be located within disengagement chamber 92. According to a preferred embodiment, the only exit path from disengagement chamber 92 for hydrocarbon conversion products discharged from riser 164 is through outlet port 190 and into outlet conduit 192.

While for purposes of simplicity, only a single outlet port 190 is shown in FIG. 2, it is within the scope of the present invention for a plurality of separation outlet portions 190 to extend through separation portions of shroud outer wall 182.

It is further noted that outlet port 190 may be located either adjacent to (not shown) or upstream (as shown) from the discharge end of lip portion 173. In order to locate port 190 adjacent lip 173, the height or downstream extension of shroud outer wall 182 may be extended downstream of lip 173. Depending on the size of tubular riser 164 and disengagement chamber 94, any number of separate outlet ports 190 may be circumferentially spaced from one another about outer wall portion 182, with each outlet port having its own outlet conduit 192. Alternatively, a plurality of outlet ports 190 may lead to a single outlet conduit 192 through a common flow manifold or the like.

Adherence to the following recommendations may be of assistance in attaining high levels of operating efficiency in separation apparatus 160. More particularly, it is preferred to locate edge portion 196 of shroud 180 in a zone extending up to about 2D upstream or up to about 3D downstream of lip portion 173. Preferably, edge 196 is located between about D upstream and D downstream from lip 173. More preferably, said zone extends from about D/3 upstream to about D/6 downstream of lip portion 172B. Presently it appears that the optimum position of edge 196 is substantially D/5 upstream where D is the effective diameter of the downstream end of outlet section 166. As shown in the drawing, edge 196 is spaced outwardly from outlet section 166 to form an inlet 197 for collection flow passageway 186.

In the preceding discussion, D refers to the effective diameter of the transverse cross-sectional open area of the downstream end of outlet section 166. Said open end may or may not be circular, and may or may not be subdivided into two or more openings, in which event there may be no diameter in the usual sense of the word. The effective diameter of the total open area of the opening(s) may be determined in any suitable manner, such as for example by application of the formula $D = \sqrt{4A/\pi}$, wherein A is the combined inside transverse cross-sectional area of said opening(s).

According to the particularly preferred embodiment referred to above, the lip portion 173 projects downstream of shroud edge 196. Thus, the shroud edge 196 is preferably upstream of lip portion 173 by a distance in the range of about D/20 to about 2D, preferably about D/12 to about D, and more preferably about D/3 to about D/8.

As shown in FIG. 2, the outlet section 166 discharges the catalyst into a space downstream of its outlet end. In this embodiment the catalyst particles are projected along discharge paths $P_1$ having components of motion in the downstream direction, based on the direction of motion of the catalyst and cracked products stream in outlet section 166. Such paths $P_1$ extend generally in the direction of a downstream extension of outlet section axis X-X. Moreover, the product vapors are projected from the downstream end of outlet section 166 as a stream S which diverges outwardly from the catalyst paths $P_1$ and diverges outwardly from axis X-X.

If and when lip portion 173 projects downstream of shroud edge 196, the gaseous conversion products of hydrocarbon cracking can be forced to flow around the corner formed by lip portion 173 as indicated by arrow S before entering collection flow passageway 186. At the same time, the momentum of the catalyst particles, which is far greater than that of the product vapors, makes it difficult for these particles to be diverted along the curved flow path indicated by arrow S.

This embodiment illustrates how the major portion of the product vapors which have been discharged from the downstream end of outlet section 166 can be caused to divert from longitudinal axis X-X by an angle of divergence of at least about 45° and, in a predetermined portion of said disengagement chamber 92 adjacent the downstream end of outlet section 166, can be formed into a coherent stream for collection and removal. Preferred embodiments of said angle are at least about 90° and more preferably at least about 105°. This embodiment also illustrates how the catalyst can be caused, at a position Z downstream of said predetermined portion of the disengagement chamber 92, to turn outwardly from axis X-X, and to travel laterally in said disengagement chamber as indicated by flow lines $P_2$, following which said catalyst particles can be caused to flow in the upstream direction along paths $P_3$ and $P_4$ disposed outwardly from said predetermined portion.

Figure 3:
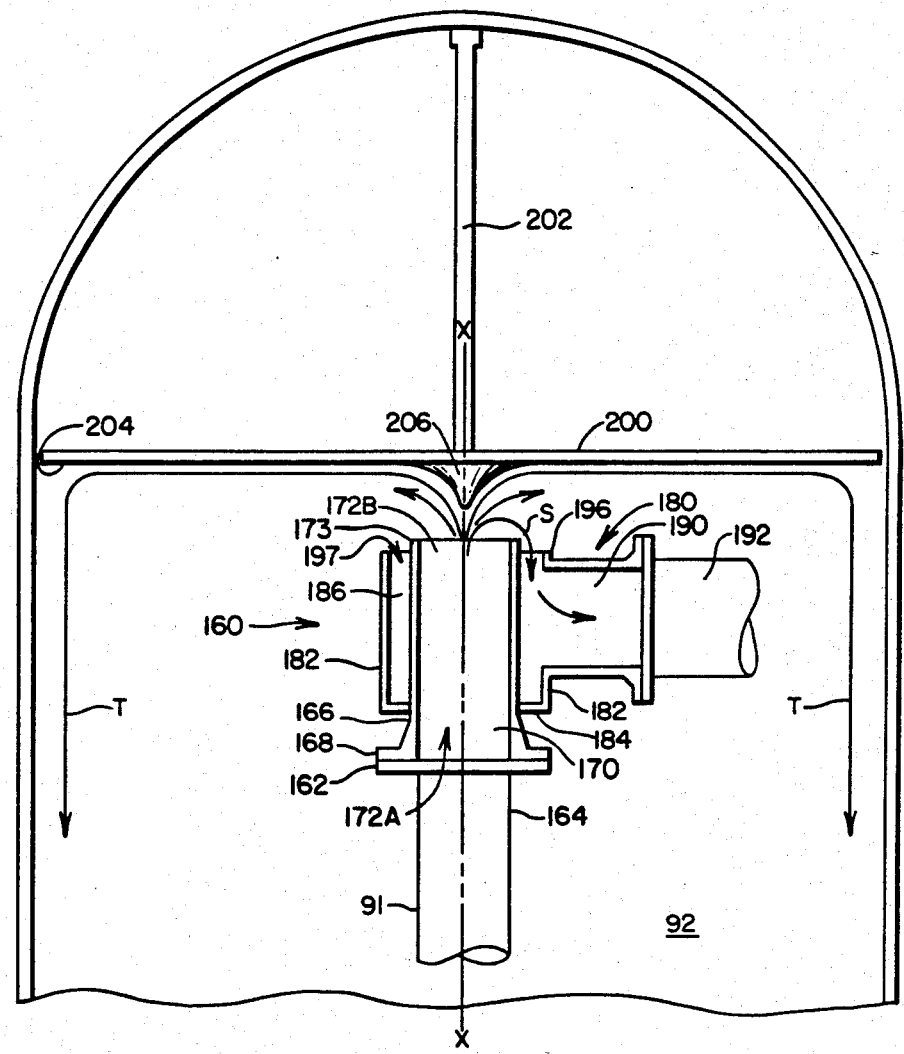
FIG. 3 illustrates another embodiment drawn similarly to FIG. 2.

A desirable and beneficial modification of the foregoing separation apparatus is disclosed in FIG. 3. It can for example include all of the parts previously described in connection with FIG. 2, along with a target which intersects outlet section longitudinal axis X-X, and which can be of assistance in achieving even higher levels of efficiency. Without wishing to be bound by any theory, it appears that the target may be of assistance in forming the separated catalyst particles into a more orderly or coherent stream which reduces the probability of such particles gaining entry to port 190 via inlet 197. The target may be of any suitable shape and size for promoting orderly flow of the catalyst particles, such as for example a flat piece as shown in FIG. 3, a segment of a sphere such as when the catalyst discharges against the inside of the hemi-spherical upper end of disengagement chamber as shown in FIG. 2, or other shape.

In general, it is preferred that the target be at least about three times the overall width of the catalyst stream or streams as they emanate from the downstream end of outlet section 166. It is believed advantageous to position the target downstream of the catalyst discharge location(s) by a distance in the range of about ½ to about 5, more preferably about 1.5 to about 3, and most preferably about 1.5 or 2 times the overall width mentioned in the preceding sentence. When a target is used, the catalyst is projected into space downstream of outlet section 166 which is open at least in a direction divergent outwardly from axis X-X In some embodiments, the target may be regarded as establishing, in cooperation with lip 173, an annular or circumferential orifice.

In the embodiment of FIG. 3, target 200 intersects the longitudinal axis X-X of outlet section 166, and is mounted within disengagement chamber 92 by hanger rod 202. Target 200 preferably includes an impact surface 204 which intersects a catalyst flow path extending downstream from outlet section 166, and extends substantially perpendicular to axis X-X.

During operation, a flow of catalyst particles and a small portion of the cracking products discharged from lip portion 173 continuously impact against surface 204. As the flow of catalyst and gases approach plate 200, the flow is diverted in a radially outwardly direction along target 200, with catalyst particles eventually falling away from the outer portions of target 200 under the influence of gravity as indicated by catalyst flow paths T.

If and when the target is sufficiently close to the downstream end of outlet section 166, as shown in FIG. 3, it may start turning the catalyst away from axis X-X as soon as it departs the outlet section. This is an illustration of how the catalyst particles can be projected along discharge paths which have components of motion in the downstream direction, and which extend in one or more directions divergent outwardly from the axis of the outlet section. Moreover, this embodiment shows how the product vapors can be projected from the downstream end of the outlet section as a stream and diverge downwardly or in the upstream direction from outwardly divergent catalyst flow paths.

This embodiment and the previous one also illustrate interposing a barrier wall between the catalyst and the resultant product stream at a position closely adjacent to the downstream extremity of the elongated reaction chamber.

The catalyst particles are preferably discharged from outlet section 166 with sufficient velocity, for example about 60-100 feet per second, to ensure that their momentum, on striking surface 204, will cause them to move outward along target 200 until the majority of the catalyst particles are well beyond the outer wall 182 of shroud 180. Within this velocity range, it is possible for the stream exiting outlet section 166 to form a pressure cone which assists in diverting flow outwardly along target impact surface 204. When the catalyst particles eventually separate from target 200, they are much more likely to miss collection flow passageway 186 as they proceed downwardly through disengagement chamber 92 under the influence of gravity. In comparison, the gaseous conversion products which impact against target 200 do not exhibit the momentum of the solid catalyst particles; hence, the gaseous products tend to quickly separate from target 200 and swirl through an adjacent area until drawn into collection flow passageway 186. At some riser velocities, such as about 60 feet per second or less, it may be beneficial to mount a deflection assembly such as cone 206 on target 200 to initiate a smooth change in direction of the stream discharged from outlet section 166. At lower velocities, such as for example 45 feet per second, it may be advantageous for the tip of cone 206 to project a short distance into the downstream end of the outlet section.

While target 200 and cone 206 can significantly increase the separation efficiency of the present invention, their use is optional.

During fluid catalytic cracking operations, a stream of hydrocarbon gases (including vapors) and solid catalyst particles may flow downstream through a tubular riser at velocities of about 25-100 (or even more) feet per second. As the stream flows through the downstream end of the outlet section 166, it may be desirable to adjust the stream velocity by reducing or increasing the cross-section of passageway 170 in the downstream direction. For a relatively slow velocity stream flowing through the riser, such as about 45 feet per second, it may be desirable to decrease the cross-section of the passageway 170 to increase the velocity of the stream prior to discharge from the outlet section. Alternatively, if a relatively high velocity stream of gases and particles is flowing through the riser, e.g. about 80-100 feet per second, it may be desirable to increase the cross-section of passageway 170 to decrease the velocity of the stream prior to discharge from the outlet section.

In a like manner, the cross-section of the shroud inlet 197 or collection passageway 186 at least partially enclosing outlet section 166 should be small enough in comparison to the area of downstream open end of the riser outlet section to minimize the opportunity for misdirected catalyst particles to gain entry into the shroud 180. At the same time, the cross-sectional area of the shroud collection passageway 186 should be large enough to prevent excessive increases in the velocity of the stream upon entering the shroud, thereby preventing the stream from undergoing excessive pressure drops as well as preventing significant abrasion of shroud passageway surfaces. When riser discharge velocities of substantially 45 feet per second occur, it is considered that a ratio of shroud collection area to riser discharge area of for example about 0.7 will ensure non-excessive stream velocities through the shroud. Likewise, when riser discharge velocities of 80 feet per second occur, it is considered that a discharge area to collection area ratio of about one is an exemplary value which will avoid excessive stream velocities through the shroud. These ratios are only considered illustrative of the range of values which can prove effective at maintaining non-excessive stream velocities required to avoid abrasive wear and excessive pressure drops downstream of the shroud assembly. It is considered within the scope of the present invention to increase or decrease the area ratio as required to achieve these goals. In the design of the equipment one will of course properly size the system components and adjust downstream processing equipment to provide adequate pressure drop from the riser discharge to the outlet 192 to promote flow of the product vapors from the outlet section 166 to outlet 192 and from thence to downstream processing equipment such as cyclones.

It is also considered desirable that the shroud outlet port be shaped to ensure that the stream does not undergo an excessive increase in velocity while flowing from the shroud collection passageway 186 into and through the outlet port 190. According to one illustrative embodiment, the area of the outlet port (or ports) is sufficient to maintain the stream velocity at about the same level as occurs in the shroud collection passageway.

What is claimed is:

1. A process for converting vaporized carbo-metallic oil to lighter product vapors comprising the steps of:
    (A) contacting said oil with fluidized particulate solids in a vertical tubular riser cracking zone at cracking conditions to produce a suspension of said lighter products in said particulate solids,
    (B) providing an annular shroud about the discharge end of the cracking zone, said shroud being open in the end adjacent to the discharge end of said cracking zone, but closed in the end opposite thereto, together with open end conduit means penetrating the outer wall of said shroud and extending radially therefrom,
    (C) passing said suspension from said cracking zone into an enlarged disengagement zone under conditions providing substantially greater momentum to said solids than said product vapors and providing a pressure differential in the direction of flow of said vapors whereby rapid separation between solids and vapor is achieved, (D) recovering product vapors thus separated from solids in said annular zone for recovery via said open end conduit means, (E) and recovering said solid particulate material from said disengagement zone for regeneration and recycle to said riser cracking zone.

2. Process according to claim 1 wherein said fluidized particulate solids comprise a fluid cracking catalyst having an overall particle size in the range of 40 to 120 microns.

3. Process according to claim 1 wherein said cracking conditions include a temperature in the range of 900° to 1400° F., a pressure in the range of 10 to 15 PSIA and a vapor residence time in the range of 0.5 to 2 seconds.

4. A process for separating a suspension of fluid cracking catalyst and hydrocarbon vapors flowing through a tubular riser cracking zone in a restricted contact time frame to avoid undesired over-conversion of hydrocarbon products which comprises, discharging said suspension from said riser into a larger catalyst collection zone at a velocity providing greater momentum to discharged catalyst particles than to said hydrocarbon product vapors, withdrawing vapors separated from catalyst particles by said momentum differential into an annular zone with an opening adjacent to and surrounding the discharge end of said riser, said separation by momentum differential being further enhanced by maintaining a pressure differential in the direction of hydrocarbon product flow to said annular zone and thence through confined passageways communicating with cyclone separating zones, and preventing separated catalyst from further contact with hydrocarbon product vapors by impingement of the catalyst upon a surface which deflects the catalyst particles outwardly and downwardly away from said annular zone.

5. Process according to claim 4 in which said separated catalyst reverses direction following impingement.

* * * * *